US012718061B2

(12) United States Patent
Koumura et al.

(10) Patent No.: US 12,718,061 B2
(45) Date of Patent: Aug. 25, 2026

(54) NEURAL NETWORK MODEL AND LEARNING METHOD OF THE SAME

(71) Applicant: Semiconductor Energy Laboratory Co., Ltd., Atsugi (JP)

(72) Inventors: Yusuke Koumura, Atsugi (JP); Koki Inoue, Atsugi (JP); Fumiya Nagashima, Isehara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 1057 days.

(21) Appl. No.: 17/783,074

(22) PCT Filed: Dec. 14, 2020

(86) PCT No.: PCT/IB2020/061875

§ 371 (c)(1),
(2) Date: Jun. 7, 2022

(87) PCT Pub. No.: WO2021/130594

PCT Pub. Date: Jul. 1, 2021

(65) Prior Publication Data

US 2023/0024698 A1 Jan. 26, 2023

(30) Foreign Application Priority Data

Dec. 27, 2019 (JP) ................................ 2019-238931

(51) Int. Cl.
*G06N 3/045* (2023.01)
*G06N 3/08* (2023.01)
(Continued)

(52) U.S. Cl.
CPC ............... *G06N 3/045* (2023.01); *G06N 3/08* (2013.01); *G06V 10/776* (2022.01); *G06V 10/82* (2022.01)

(58) Field of Classification Search
CPC ...................................................... G06N 3/045
See application file for complete search history.

(56) References Cited

U.S. PATENT DOCUMENTS 10,141,069 B2 11/2018 Ikeda. et al.
10,395,147 B2 8/2019 Stenger et al.
(Continued)

FOREIGN PATENT DOCUMENTS

CN 109242865 A 1/2019
JP 2019-082979 A 5/2019
(Continued)

OTHER PUBLICATIONS

Akçay, Samet, Amir Atapour-Abarghouei, and Toby P. Breckon. "Skip-ganomaly: Skip connected and adversarially trained encoder-decoder anomaly detection." In 2019 international joint conference on neural networks (IJCNN), pp. 1-8. IEEE, 2019. (Year: 2019).*
(Continued)

*Primary Examiner* — Kakali Chaki
*Assistant Examiner* — Charles Jeffrey Jones
(74) *Attorney, Agent, or Firm* — Eric J. Robinson; Robinson Intellectual Property Law Office, P.C.

(57) ABSTRACT

A neural network model that can perform highly accurate processing on input data is provided. The neural network model includes first and second neutral networks, and the first neural network includes a first layer, a second layer, and a third layer. A feature map output from the first layer is input to the second layer and the second neural network, and a feature map output from the second neural network is input to the third layer. Given that the feature map output from the first layer when first data is input to the first neural network is a correct feature map and that the feature map output from the first layer when second data obtained by adding noise to the first data is input to the first neural network is a learning
(Continued)

feature map, the second neural network is learned so that a feature map output from the second neural network matches the correct feature map when the learning feature map is input.

14 Claims, 17 Drawing Sheets

(51) Int. Cl.
*G06V 10/776* (2022.01)
*G06V 10/82* (2022.01)

(56) References Cited

U.S. PATENT DOCUMENTS

| | | | |
|---|---|---|---|
| 10,922,605 | B2 | 2/2021 | Kurokawa |
| 10,970,819 | B2 | 4/2021 | Xu et al. |
| 11,227,390 | B2 | 1/2022 | Huo et al. |
| 11,615,535 | B2 | 3/2023 | Huo et al. |
| 2017/0118479 | A1 | 4/2017 | Kurokawa et al. |
| 2020/0104708 | A1 | 4/2020 | Motoki |
| 2022/0075815 | A1 | 3/2022 | Akimoto et al. |
| 2022/0138983 | A1 | 5/2022 | Godo et al. |

FOREIGN PATENT DOCUMENTS

| | | | |
|---|---|---|---|
| JP | 2019-105899 | A | 6/2019 |
| JP | 2020-057172 | A | 4/2020 |
| WO | WO-2018/216207 | | 11/2018 |
| WO | WO-2020/063589 | | 4/2020 |

OTHER PUBLICATIONS

Rasmus, Antti, Mathias Berglund, Mikko Honkala, Harri Valpola, and Tapani Raiko. "Semi-supervised learning with ladder networks." Advances in neural information processing systems 28 (2015). (Year: 2015).*

Ronneberger.O et al., "U-Net: Convolutional Networks for Biomedical Image Segmentation", MICCAI 2015 (International Conference on Medical Image Computing and Computer-Assisted Intervention), Nov. 18, 2015, pp. 234-241.

Meng.Z et al., "ENS-Unet: End-to-end Noise Suppression U-net for Brain Tumor Segmentation", EMBC 2018 (40th Annual International Conference of the IEEE Engineering in Medicine and Biology Society) , Jul. 1, 2018, pp. 5886-5889.

International Search Report (Application No. PCT/IB2020/061875) Dated Mar. 30, 2021.

Written Opinion (Application No. PCT/IB2020/061875) Dated Mar. 30, 2021.

* cited by examiner

| | | |
|---|---|---|
| −1 | −1 | −1 |
| −1 | 8 | −1 |
| −1 | −1 | −1 |

FIG. 12B

| | | |
|---|---|---|
| −1 | −1 | −1 |
| 0 | 0 | 0 |
| 1 | 1 | 1 |

FIG. 12C

| | | |
|---|---|---|
| −1 | −2 | −1 |
| 0 | 0 | 0 |
| 1 | 2 | 1 |

NEURAL NETWORK MODEL AND LEARNING METHOD OF THE SAME

TECHNICAL FIELD

One embodiment of the present invention relates to a neural network model. Another embodiment of the present invention relates to a learning method of the neural network model.

BACKGROUND ART

A technique of performing image processing with AI (Artificial Intelligence) has attracted attention. For example, Patent Document 1 discloses a segmentation technique in which a class of objects included in an image and a region of the object are detected with use of a neural network. Techniques of colorizing monochrome images, estimating the depth thereof, and the like with use of AI have been developed.

In addition, a neural network including skip-connected layers has been developed. Here, the skip connection indicates a structure in which a feature map output from a layer in the neural network is input not only to the next layer but also to another layer closer to an output layer. Non-Patent Document 1 discloses U-Net as a neural network having skip connection. In the U-Net, the skip connection enables information in image data input to a neural network to be reflected easily in a feature map output from a layer close to the output layer, for example. This makes it possible to perform image processing with high accuracy. With the U-Net, for example, information such as a position or an outline of an object, which is included in image data input to the neural network, is easily reflected in a feature map output from a layer close to the output layer; thus, segmentation can be performed with high accuracy.

PRIOR ART DOCUMENT

Patent Document

[Patent Document 1] Japanese Published Patent Application No. 2019-82979

Non-Patent Document

[Non-Patent Document 1] Olaf Ronneberger, Philipp Fischer, and Thomas Brox, "U-Net: Convolutional Networks for Biomedical Image Segmentation", Medical Image Computing and Computer-Assisted Intervention, 234-241 (2015).

SUMMARY OF THE INVENTION

Problems to be Solved by the Invention

When a neural network including skip-connected layers is supplied with data (input data) has noise, the noise is likely to be transmitted to a layer close to an output layer. This may lead to an incapability of performing highly accurate processing of the data.

An object of one embodiment of the present invention is to provide a neural network model which enables noise included in input data to be removed. Another object is to provide a neural network model which enables highly accurate processing of input data. Another object is to provide a novel neural network model.

Another object of one embodiment of the present invention is to provide a learning method of a neural network model which enables noise included in input data to be removed. Another object is to provide a learning method of a neural network model which enables highly accurate processing of input data. Another object is to provide a novel learning method of a neural network model.

Note that the description of these objects does not preclude the existence of other objects. One embodiment of the present invention does not have to achieve all these objects. Note that objects other than these will be apparent from the description of the specification, the drawings, the claims, and the like, and objects other than these can be derived from the description of the specification, the drawings, the claims, and the like.

Means for Solving the Problems

One embodiment of the present invention is a neural network model and its learning method. The neural network model includes a first neural network and a second neural network, and the first neural network includes skip-connected layers via the second neural network. The second neural network has a function of removing noise from an input feature map. Accordingly, even when data input to the first neural network has noise, the noise can be inhibited from being transmitted to a layer close to an output layer of the first neural network.

When learning of the neural network model of one embodiment of the present invention is performed, first, an initial value of a weight coefficient of the first neural network is acquired. Next, first learning is performed, so that a weight coefficient of the second neural network is acquired. Then, second learning is performed, so that a weight coefficient of the first neural network is acquired. After the first learning and the second learning are performed, inference accuracy of the neural network model of one embodiment of the present invention is evaluated. The first learning and the second learning are performed until the inference accuracy comes to have a predetermined value or a value higher than the predetermined value.

One embodiment of the present invention is a neural network model including a first neural network and a second neural network. The first neural network includes a first layer, a second layer, and a third layer. A feature map output from the first layer is input to the second layer and the second neural network. A feature map output from the second neural network is input to the third layer. When first data is input to the first neural network, in the second neural network, a feature map output from the first layer is a correct feature map. When second data obtained by adding noise to the first data is input to the first neural network, in the second neural network, a feature map output from the first layer is a learning feature map. The second neural network is learned with first learning so that the feature map output from the second neural network matches the correct feature map when the learning feature map is input to the second neural network.

In the above embodiment, a weight coefficient of the second neural network may be acquired with the first learning after data for acquiring an initial value is input to the first neural network to acquire an initial value of a weight coefficient of the first neural network.

In the above embodiment, the weight coefficient of the first neural network may be acquired with the second learning performed by inputting the second data to the first neural network after acquiring the weight coefficient of the second neural network.

In the above embodiment, the first neural network may include a fourth layer, a fifth layer, and a sixth layer. A feature map output from the fourth layer may be input to the fifth layer and the sixth layer skip-connected to the fourth layer. The fourth layer may be closer to the output layer of the first neural network than the first layer is, and the third layer may be closer to the output layer of the first neural network than the sixth layer is.

Another embodiment of the present invention is a neural network model including a first neural network and a second neural network. The first neural network includes a first layer, a second layer, a third layer, and a fourth layer. The fourth layer, the third layer, the second layer, and the first layer, in this order, are close to an output layer of the first neural network. A feature map output from the first layer is input to the second layer and the second neural network. A feature map output from the third layer and a feature map output from the second neural network are input to the fourth layer. When first data is input to the first neural network, a feature map output from the first layer is a correct feature map. When second data obtained by adding noise to the first data is input to the first neural network, a feature map output from the first layer is a learning feature map. The second neural network is learned with first learning so that a feature map output from the second neural network matches the correct feature map when the learning feature map is input to the second neural network.

In the above embodiment, a weight coefficient of the second neural network may be acquired with the first learning after data for acquiring an initial value is input to the first neural network to acquire an initial value of a weight coefficient of the first neural network.

In the above embodiment, the weight coefficient of the first neural network may be acquired with the second learning performed by inputting second data to the first neural network after the weight coefficient of the second neural network is acquired.

In the above embodiment, the first neural network model may include a fifth layer, a sixth layer, and a seventh layer. A feature map output from the fifth layer may be input to the sixth layer and the seventh layer skip-connected to the fifth layer. The fifth layer may be closer to the first neural network than the first layer be, and the fourth layer may be closer to the output layer of the first neural network than the seventh layer be.

Another embodiment of the present invention is a learning method of a neural network model including a first neural network and a second neural network, where the first neural network includes a first layer, a second layer, and a third layer, where a feature map output from the first layer is input to the second layer and the second neural network, and where a feature map output from the second neural network is input to the third layer. The learning method includes a first step of acquiring an initial value of a weight coefficient of the first neural network by inputting data for acquiring initial data to the first neural network; a second step of acquiring a weight coefficient of the second neural network by performing first learning under a condition that a feature map output from the first layer when first data is input to the first neural network is a correct feature map and a feature map output from the first layer when second data obtained by adding noise to the first data is input to the first neural network is a learning feature map, so that the feature map output from the second neural network matches the correct feature map when the learning feature map is input to the second neural network; a third step of performing second learning by inputting the second data to the first neural network, thereby acquiring a weight coefficient of the first neural network; and a fourth step of inputting test data to the first neural network, thereby evaluating inference accuracy of the neural network model on the basis of output data output from the first neural network. The second to fourth steps are repeated until the accuracy inference comes to have a predetermined value or a value higher than the predetermined value.

In the above embodiment, the first neural network may include a fourth layer, a fifth layer, and a sixth layer. A feature map output from the fourth layer may be input to the fifth layer and the sixth layer skip-connected to the fourth layer. The fourth layer may be closer to the output layer of the first neural network than the first layer be, and the third layer may be closer to the output layer of the first neural network than the sixth layer be.

Effect of the Invention

According to one embodiment of the present invention, a neural network model which enables noise included in input data to be removed can be provided. Alternatively, a neural network model which enables highly accurate processing of input data can be provided. Alternatively, a novel neural network model can be provided.

According to one embodiment of the present invention, a learning method of a neural network model which enables noise included in input data to be removed can be provided. Alternatively, a learning method of a neural network model which enables highly accurate processing of input data can be provided. Alternatively, a novel learning method of a neural network model can be provided.

Note that the effects of embodiments of the present invention are not limited to the effects listed above. The effects listed above do not preclude the existence of other effects. Note that the other effects are effects that are not described in this section and will be described below. The effects that are not described in this section are derived from the description of the specification, the drawings, or the like and can be extracted from the description by those skilled in the art.

Note that one embodiment of the present invention has at least one of the effects listed above and/or the other effects. Accordingly, depending on the case, one embodiment of the present invention does not have the effects listed above in some cases.

BRIEF DESCRIPTION OF THE DRAWINGS

FIG. 4A, FIG. 4B1, FIG. 4B2, and FIG. 4C are diagrams illustrating an example of a learning method of a neural network model.

FIG. 12A to 12C are diagrams showing filters.

MODE FOR CARRYING OUT THE INVENTION

Figure 1A:
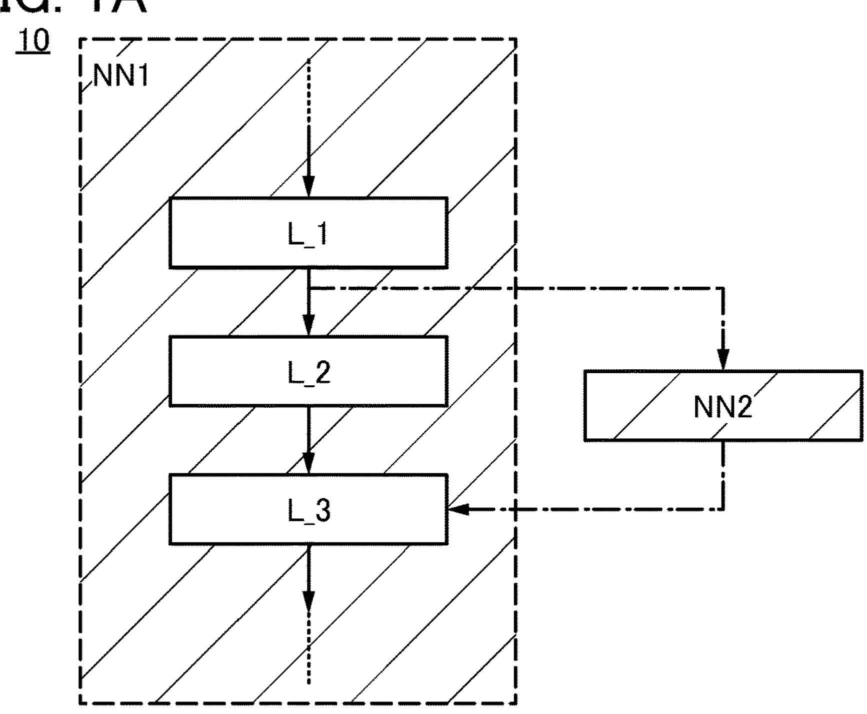
FIG. 1A and FIG. 1B are diagrams each illustrating a structure example of a neural network model.

Embodiments will be described in detail with reference to the drawings. Note that the present invention is not limited to the following description, and it will be readily appreciated by those skilled in the art that modes and details of the present invention can be modified in various ways without departing from the spirit and scope of the present invention. Therefore, the present invention should not be interpreted as being limited to the description of embodiments below. Note that in structures of the invention described below, the same portions or portions having similar functions are denoted by the same reference numerals in different drawings, and the description thereof is not repeated in some cases. The same components are denoted by different hatching patterns in different drawings, or the hatching patterns are omitted in some cases.

Ordinal numbers such as “first”, “second”, and “third” used in this specification and the like are used in order to avoid confusion among components and do not limit the components numerically.

Even in the case where a single component is illustrated in a circuit diagram, the component may be composed of a plurality of parts as long as there is no functional inconvenience. For example, in some cases, a plurality of transistors that operate as a switch are connected in series or in parallel. In some cases, capacitors are divided and arranged in a plurality of positions.

One conductor has a plurality of functions such as a wiring, an electrode, and a terminal in some cases. In this specification, a plurality of names are used for the same component in some cases. Even in the case where components are illustrated in a circuit diagram as if they were directly connected to each other, the components may actually be connected to each other through a plurality of conductors; in this specification, even such a structure is included in the category of direct connection.

Embodiment

In this embodiment, an example of a neural network model of one embodiment of the present invention, an example of a learning method of the neural network model, and the like will be described.

<Neural Network Model_1>

FIG. 1A illustrates a structure example of a neural network model 10 that is a neural network mode of one embodiment of the present invention. The neural network model 10 includes a neural network NN1 and a neural network NN2.

The neural network NN1 includes a plurality of layers composed of neurons, and the neurons provided in each layer are connected to each other. Thus, the neural network NN1 can be referred to as a hierarchical neural network. Each layer composed of the neurons has a function of extracting a feature value from data input to the layer and a function of outputting data representing the feature value as a feature map. The neural network NN2 can also be a hierarchical neural network.

In FIG. 1A, a layer L_1, a layer L_2, and a layer L_3 are illustrated as the layers included in the neural network NN1. The data flow between the layers is indicated by arrows.

In this specification and the like, when a plurality of components are denoted by the same reference numerals, and in particular need to be distinguished from each other, an identification sign such as “_1” or “[1]” is sometimes added to the reference numerals. For example, in FIG. 1A and the like, three layers L are denoted by the layer L_1, the layer L_2, and the layer L_3 to distinguish from each other.

The neural network includes an input layer, an output layer, and an intermediate layer between the input layer and the output layer. A plurality of intermediate layers can be provided in one neural network. The layer L_1, the layer L_2, and the layer L_3 illustrated in FIG. 1A can be intermediate layers. Note that the layer L_1 may be an input layer, and the layer L_3 may be an output layer.

In this specification and the like, inputting data into the input layer of the neural network is referred to as inputting data to the neural network in some cases. In addition, outputting data from the output layer of the neural network is referred to as outputting data from the neural network in some cases.

A feature map output from the layer L_1 is input to the layer L_2, and a feature map output from the layer L_2 is input to the layer L_3. That is, data is sequentially transmitted to the layer L_1, the layer L_2, and the layer L_3 in this order. Thus, it can be said that the layer next to the layer L_1 is the layer L_2, and the layer next to the layer L_2 is the layer L_3.

The feature map output from the layer L_1 is also input to the neural network NN2. Specifically, in the case where the neural network NN2 is a hierarchical neural network including an input layer, an intermediate layer, and an output layer, the feature map output from the layer L_1 is input to the input layer of the neural network NN2. A feature map output from the neural network NN2 is input to the layer L_3.

Here, the neural network NN2 has a function of removing noise included in the feature map input to the neural network NN2. Thus, it can be said that the feature map input to the layer L_3 is a feature map, which has been input from the layer L_1 to the neural network NN2 and from which noise is removed by the neural network NN2. Accordingly, it can be said that the feature map output from the layer L_1 is input to the layer L_3 via the neural network NN2.

As described above, the layer next to the layer L_1 is the layer L_2. Meanwhile, the feature map output from the layer L_1 and input to the neural network NN2 is to be input to the layer L_3 via the neural network NN2. That is, the feature map output from the layer L_1 and input to the neural network NN2 skips over the layer L_2 next to the layer L_1 and is input to the layer L_3. Thus, it can be said that the layer L_1 and the layer L_3 are skip-connected via the neural network NN2. Furthermore, the layer L_3 can be referred to as a connected layer that connects the feature map output from the layer L_1 and the feature map output from the layer L_2.

In this specification and the like, the layers skip-connected to each other are connected with dashed-dotted lines. For example, in FIG. 1A, the skip connection of the layer L_1 and the layer L_3 via the neural network NN2 is indicated by the dashed-dotted lines connecting the layer L_1 to the neural network NN2 and the neural network NN2 to the layer L_3.

The neural network NN1 has a function of outputting a predetermined inference result of data input to the input layer, as a feature map, from the output layer. For example, when image data is input to the input layer of the neural network NN1, the neural network NN1 has a function of performing segmentation or depth estimation on the image data. Alternatively, when monochrome or grayscale image data is input to the neural network NN1, the neural network NN1 has a function of producing color image data from the image data.

In this specification and the like, the feature map output from the output layer is referred to as output data output from the neural network including the output layer, in some cases.

When a neural network including skip-connected layers is supplied with data including noise, the noise is likely to be transmitted to a layer close to the output layer. This may lead to an incapability of performing high-accurate inference on the data. Meanwhile, the neural network NN1 included in the neural network model 10 includes layers skip-connected via the neural network NN2 having a function of removing noise. This can inhibit the noise from being transmitted to a layer close to the output layer even when data input to the neural network NN1 includes the noise. Thus, inference of the data can be performed with high accuracy.

Figure 1B:
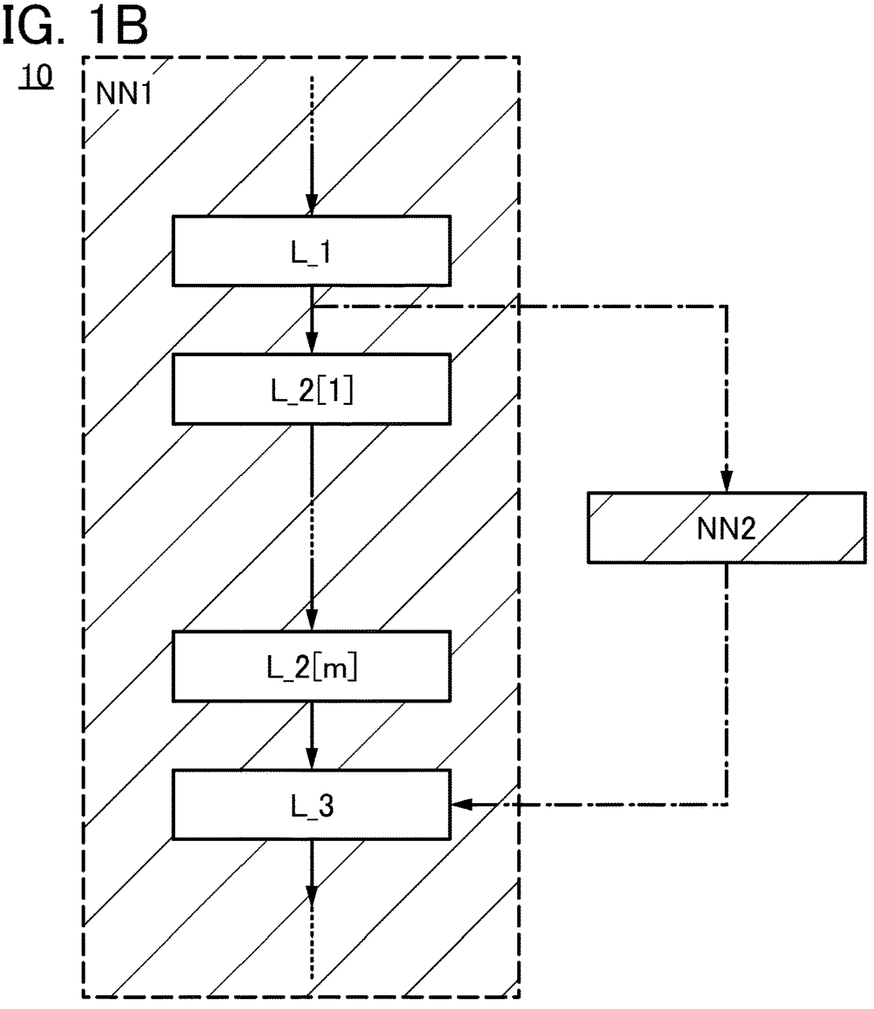

In the neural network model 10 illustrated in FIG. 1A, one layer is provided as the layer L between the layer L_1 and the layer L_3 that are skip-connected via the neural network NN2; however, the present invention is not limited thereto. As illustrated in FIG. 1B, m layers L_2 (m is an integer greater than or equal to 2) may be provided between the layer L_1 and the layer L_3. In FIG. 1B, the m layers L_2 are denoted by a layer L_2[1] to a layer L_2[*m*] sequentially from the layer the closest to the input layer of the neural network NN1 to distinguish from each other.

In the neural network model 10 illustrated in FIG. 1B, the feature map output from the layer L_1 is input to the layer L_2[1] and the neural network NN2. To the layer L_3, the feature map output from the layer L_2[*m*] and the feature map output from the neural network NN2 are input.

The neural network NN1 included in the neural network model 10 can be a convolutional neural network (CNN). When the neural network NN1 has the structure illustrated in FIG. 1B and is a CNN, the layer L_1 and the layer L_2[*m*] can be pooling layers, for example.

For example, the neural network NN2 can be an autoencoder. For example, the neural network NN2 can be generative adversarial networks (GAN). In the case where the neural network NN2 is GAN, Conditional GAN can be used, for example. It is preferable that the neural network NN2 be GAN because inference by the neural network NN2, e.g., the removal of noise in the feature map input to the neural network NN2, can be performed with high accuracy.

<Learning Method>

Figure 2:
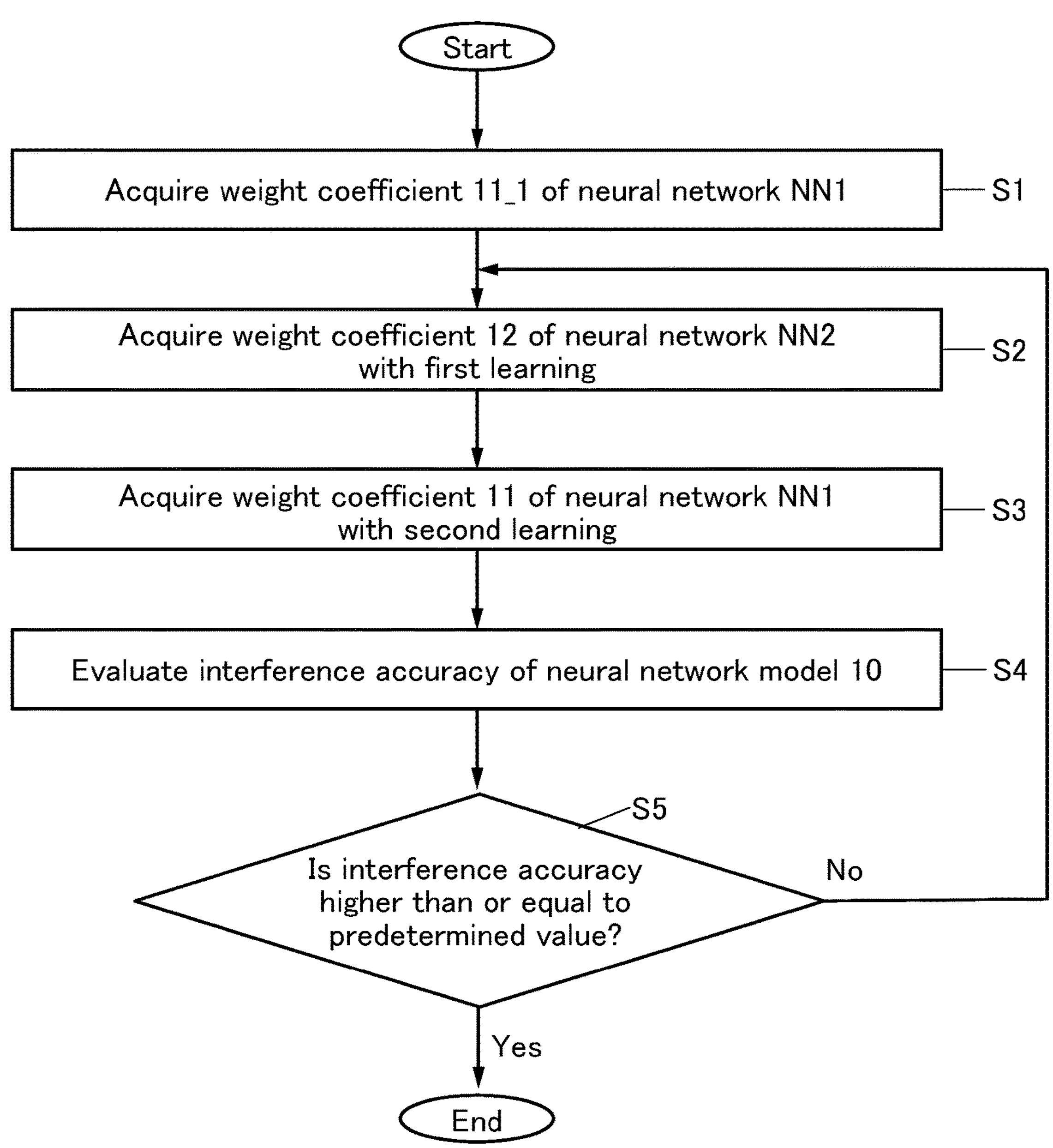
FIG. 2 is a flow chart showing an example of a learning method of a neural network model.

Next, an example of a learning method of the neural network model 10 is described with reference to FIG. 2 to FIG. 6. FIG. 2 is a flow chart showing an example of a learning method of the neural network model 10. FIG. 3 to FIG. 6 are schematic views showing an example of processing in steps shown in FIG. 2. Note that in FIG. 3 to FIG. 6, the neural network model 10 is assumed to have the structure illustrated in FIG. 1A. In addition, the example of the learning method of the neural network model 10 in FIG. 3 to FIG. 6 is for making the neural network NN1 have a function of performing segmentation on image data when the image data is input to the neural network NN1.

[Step S1]

Figure 3A:
FIG. 3A and FIG. 3B are diagrams each illustrating an example of a learning method of a neural network model.
Figure 3A:
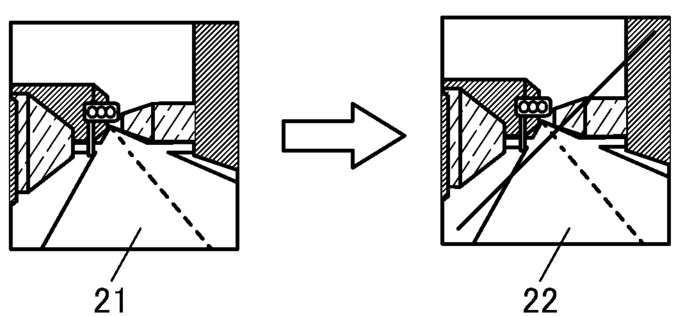
Figure 3B:
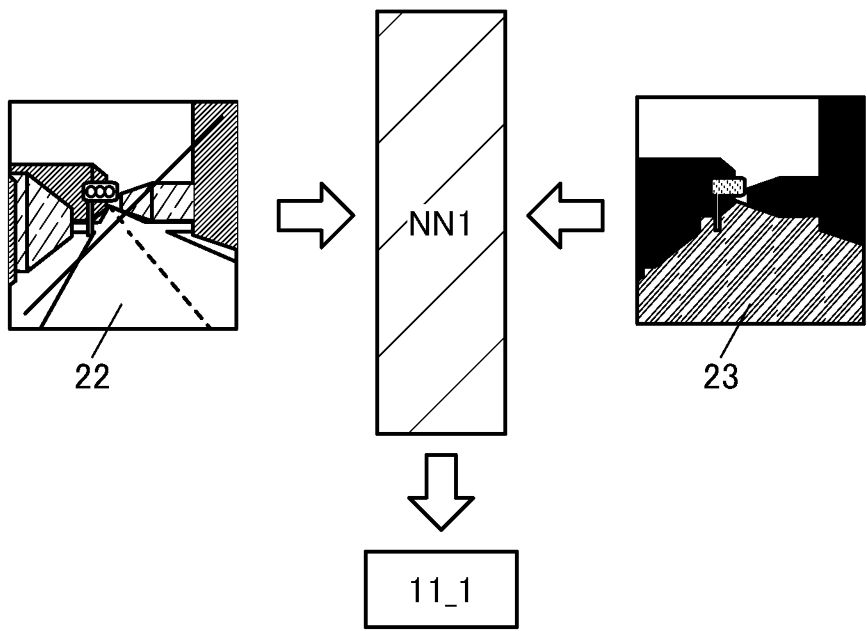

First, data for acquiring an initial value is input to the neural network NN1, so that a weight coefficient 11_1 that is an initial value of a weight coefficient 11 of the neural network NN1 is acquired (Step S1). FIG. 3A and FIG. 3B are schematic views illustrating an example of processing in Step S1. Specifically, FIG. 3A is a schematic view illustrating an example of processing in Step S1_1, and FIG. 3B is a schematic view illustrating an example of processing in Step S1_2.

As illustrated in FIG. 3A, data 21 is prepared in Step S1_1. The data 21 can be expressed by, for example, a matrix. Here, when the data 21 is image data obtained by imaging, for example, an element of the matrix can be a grayscale value representing illuminance of light incident on a pixel included in an imaging device. Another element can be a grayscale value representing luminance of light emitted from a pixel in a display device displaying an image corresponding to the data 21. Accordingly, the number of rows and the number of columns in the matrix representing the data 21 can be equal to the resolution of an image corresponding to the data 21. Note that data other than the data 21 can be expressed by a matrix in some cases. Such data can be expressed by, for example, a matrix with the same numbers of rows and columns as those for the data 21, in some cases. Alternatively, the data can be expressed by a matrix with smaller numbers of rows and columns than those for the data 21, in some cases.

Data assumed as noise is added to the data 21, so that data 22 is acquired. For example, assuming that data input to the neural network NN1 is image data acquired by capturing an image with a camera, the supposed noise can be a scratch on a lens of the camera or a water droplet attached onto the camera, for example. Alternatively, the supposed noise can be shot noise generated when capturing an image is performed in a dark place. Furthermore, assuming that data input to the neural network NN1 is image data obtained by capturing an image displayed on a display device, the supposed noise can be a defect such as a point defect or a line defect, for example. In the case where the data added to the data 21 is desired to be removed by the neural network NN2, the added data is not necessarily assumed as noise.

According to the above method, the data 22 is created on the basis of the data 21 in Step S1_1; one embodiment of the present invention is not limited thereto. For example, the data 21 may be created on the basis of the data 22. In this case, the data 22 is acquired by capturing an image in the rainy environment, for example, and image processing is performed on the data 22 to remove a water droplet, whereby the data 21 can be acquired.

Next, as illustrated in FIG. 3B, the data 22 and data 23 are input to the neural network NN1 in Step S1_2. Here, the data 23 can be data representing a desired object as a result of segmentation of the data 22, for example. Consequently, the weight coefficient 11_1 that is an initial value of the weight coefficient 11 of the neural network NN1 can be acquired. For example, when the data 22 is input to the neural network NN1, the neural network NN1 enables acquisition of the weight coefficient 11_1 such that an error between output data from the neural network NN1 and the data 23 can be minimized.

Although one piece of the data 21 is prepared in Step S1_1 illustrated in FIG. 3A, two or more pieces of the data 21 may be prepared. Although one piece of the data 22 and one piece of the data 23 are input to the neural network NN1 in Step S1_2 illustrated in FIG. 3B, two or more pieces of the data 22 and two or more pieces of the data 23 may be input to the neural network NN1. In addition, the data 23 is not necessarily input to the neural network NN1 in Step S1_2. For example, when learning of the neural network NN1 described later is performed with unsupervised learning, the data 23 is not necessarily input to the neural network NN1.

In the case where processing in Step S1 is performed with the procedure illustrated in FIG. 3A and FIG. 3B, the data 22 can be referred to as data for acquiring an initial value. Both the data 22 and the data 23 can be referred to as data for acquiring an initial value.

At the stage of Step S1, the neural network NN2 has not yet acquired a weight coefficient. Thus, in Step S1, processing by the neural network NN2 is not performed.

[Step S2]

Figures 4A, 4C:
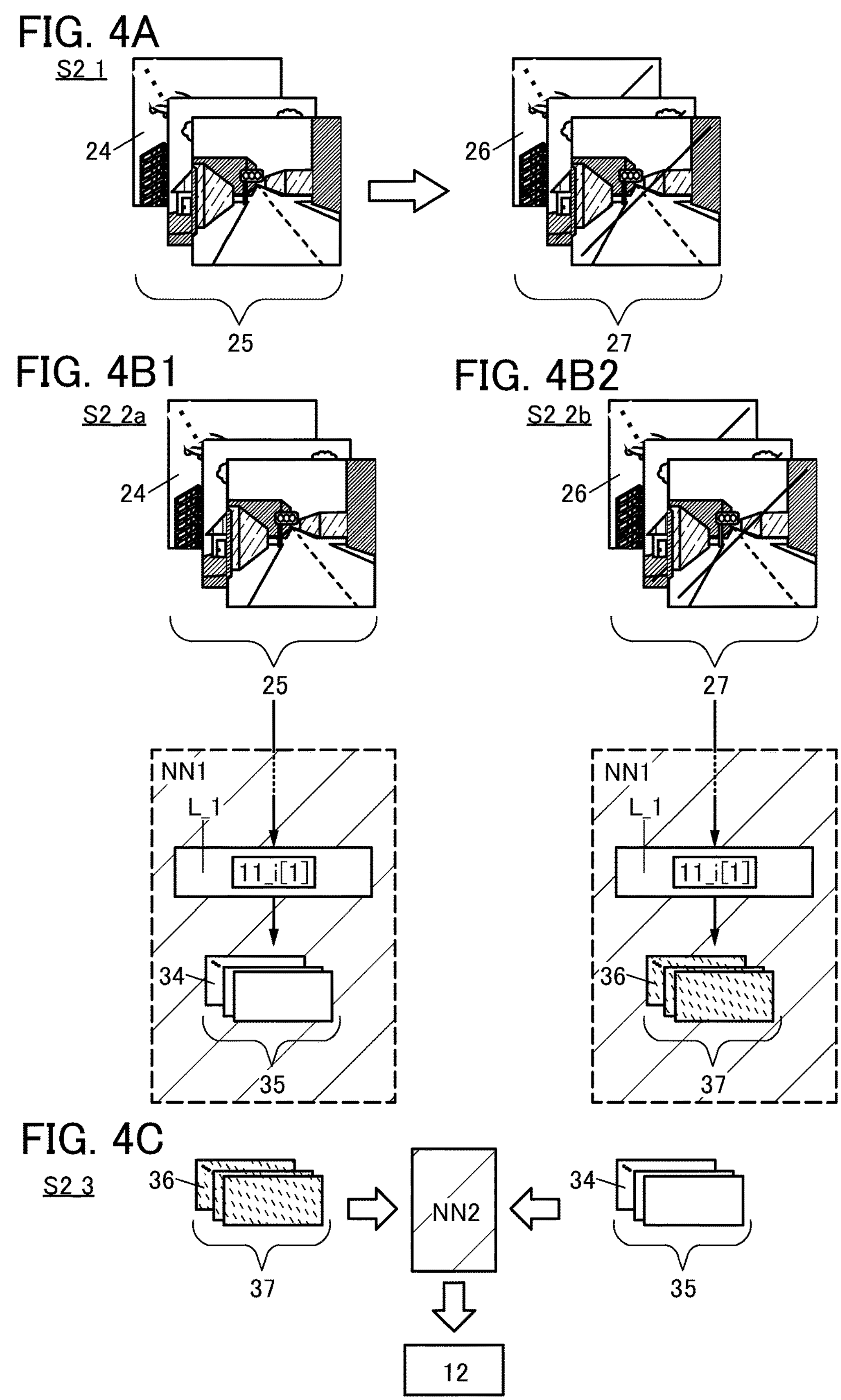

Next, the neural network model 10 performs first learning to acquire a weight coefficient 12 of the neural network NN2 (Step S2). FIG. 4A, FIG. 4B1, FIG. 4B2, and FIG. 4C are schematic views illustrating an example of processing in Step S2. Specifically, FIG. 4A is a schematic view illustrating an example of processing in Step S2_1; FIG. 4B1 is a schematic view illustrating an example of processing in Step S2_2*a*; FIG. 4B2 is a schematic view illustrating an example of processing in Step S2_2*b*; and FIG. 4C is a schematic view illustrating an example of processing in Step S2_3.

In Step S2, each layer included in the neural network NN1 holds a weight coefficient 11_*i* (i is an integer greater than or equal to 1). When Step S2 is performed immediately after Step S1, i can be 1. In FIG. 4B1 and FIG. 4B2, the weight coefficient 11_*i* held in the layer L_1 is denoted by a weight coefficient 11_*i*[1].

The details of Step S2 where first learning is performed are described below. As illustrated in FIG. 4A, in Step S2_1, a data set 25 including a plurality of pieces of data 24 is prepared, and data assumed as noise is added to each piece of data 24, so that data 26 is acquired. Accordingly, a data set 27 including a plurality of pieces of data 26 is acquired. The noise added to the data 24 can be the same kind of noise as that can be added to the data 21 illustrated in FIG. 3A. Note that the data added to the data 24 is not necessarily assumed as noise as long as the data is desired to be removed by the neural network NN2, like the data added to the data 21.

According to the above method, the data 26 is created on the basis of the data 24 in Step S2_1; one embodiment of the present invention is not limited thereto. The data 24 and the data 26 can be acquired in a manner similar to those for the data 21 and the data 22 in Step S1_1. For example, in the case where the data 21 is created on the basis of the data 22 in Step S1_1, the data 24 is created on the basis of the data 26 in Step S2_1, so that the data 24 and the data 26 can be acquired.

Next, as illustrated in FIG. 4B1, the data 24 is input to the neural network NN1 in Step S2_2*a*, so that a feature map 34 output from the layer L_1 is acquired. For example, for the plurality of pieces of data 24 included in the data set 25, respective feature maps 34 are acquired. Accordingly, a feature map set 35 including a plurality of feature maps 34 is acquired. As illustrated in FIG. 4B2, the data 26 is input to the neural network NN1 in Step S2_2*b*, so that a feature map 36 output from the layer L_1 is acquired. For example, for the plurality of pieces of data 26 included in the data set 27, respective feature maps 36 are acquired. Accordingly, a feature map set 37 including a plurality of feature maps 36 is acquired.

After that, as illustrated in FIG. 4C, the feature map 36 and the feature map 34 are input to the neural network NN2 as learning data and correct data, respectively in Step S2_3. Accordingly, the weight coefficient 12 of the neural network NN2 can be acquired. For example, the neural network NN2 can acquire the weight coefficient 12 that allows a feature map output from the neural network NN2 to which the feature map 36 has been input to match the feature map 34 corresponding to the feature map 36. Specifically, it is possible to acquire the weight coefficient 12 that enables a minimum error between a feature map output from the neural network NN2 to which the feature map 36 has been input and the feature map 34 that is correct data, by a gradient descent method using an error function (also referred to as loss function), for example. As the error function, the sum of squared errors, cross entropy loss, or the like can be used. In the gradient descent method, a weight coefficient that allows a minimum error function is acquired. The minimum value can be calculated by, for example, differentiating the error function. The differential of the error function can be calculated by, for example, a backpropagation method.

When the neural network NN2 is Conditional GAN, the feature map 34 is input to a generator, and the feature map 36 is input to a discriminator, whereby the neural network NN2 can perform learning.

In this specification and the like, a feature map that can be used as learning data is referred to as a learning feature map, and a feature map that can be used as correct data is referred to as a correct feature map. For example, the feature map 36 can be referred to as a learning feature map, and the feature map 34 can be referred to as a correct feature map.

[Step S3]

Figure 5:
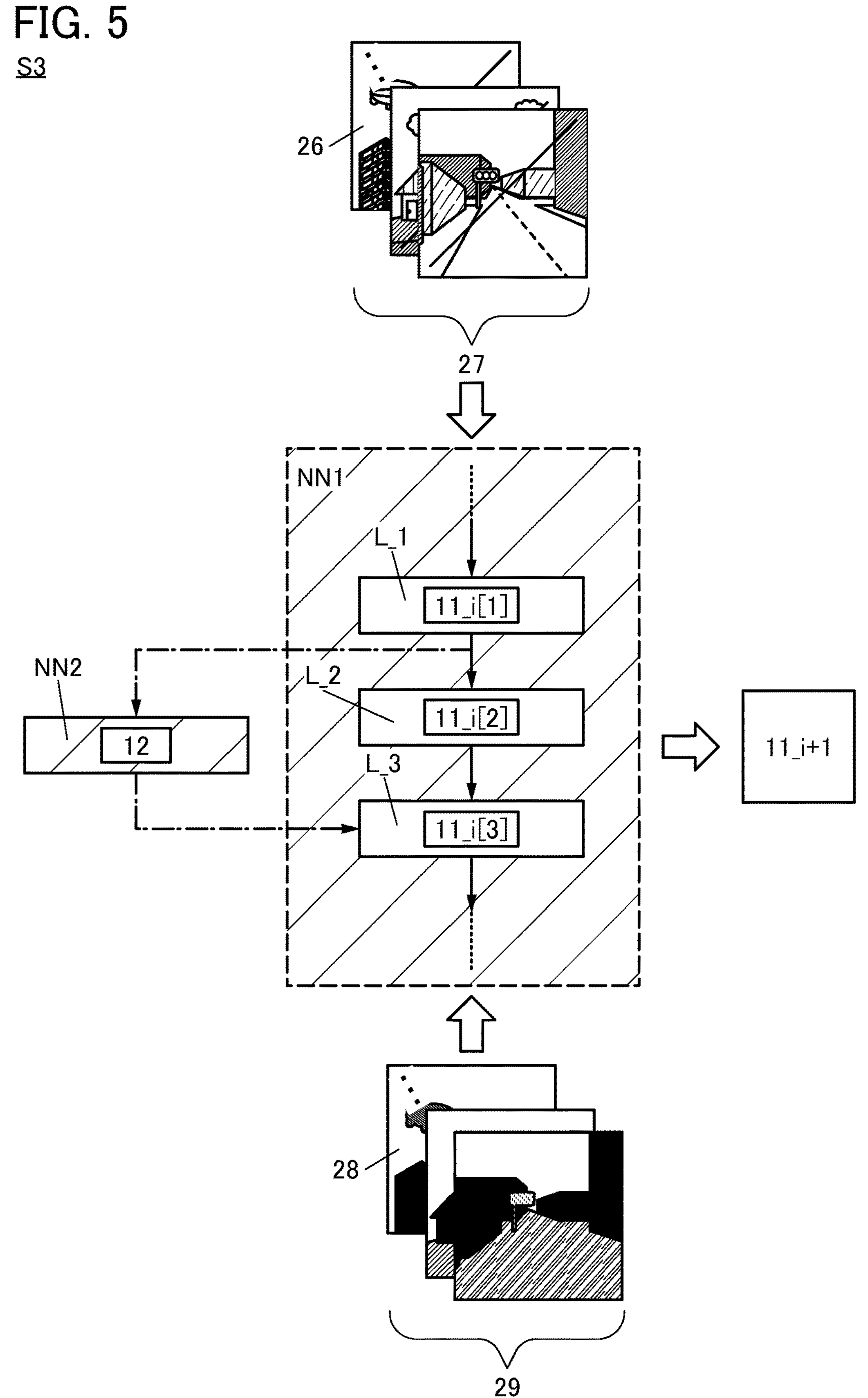
FIG. 5 is a diagram illustrating an example of a learning method of a neural network model.

Next, the neural network model 10 performs second learning to acquire the weight coefficient 11 of the neural network NN1 (Step S3). FIG. 5 is a schematic view illustrating an example of processing in Step S3.

In Step S3, each layer included in the neural network NN1 holds the weight coefficient 11_*i*. As described above, when the initial value of the weight coefficient 11 is held in each layer included in the neural network NN1, for example, i can be 1. In addition, the neural network NN2 holds the weight coefficient 12 acquired in the last step, Step S2. In FIG. 5, the weight coefficient 11_*i* held in the layer L_1 is denoted by the weight coefficient 11_*i*[1]; the weight coefficient 11_*i* held in the layer L_2 is denoted by a weight coefficient 11_*i*[2]; and the weight coefficient 11_*i* held in the layer L_3 is denoted by a weight coefficient 11_*i*[3].

In Step S3, the data 26 and data 28 are input to the neural network NN1 as learning data and correct data, respectively. Here, the data 26 can be identical to the data 26 acquired in Step S2_1 illustrated in FIG. 4A and input to the neural network NN1 in Step S2_2*b* illustrated in FIG. 4B2. That is, learning data used for learning of the neural network NN1 can be data identical to the data input to the neural network NN1 in learning of the neural network NN2 in Step S2 for acquiring the feature map 36 that is a learning feature map.

The data 28 can be data representing a desired object as a result of segmentation of the data 26, for example. Here, an aggregate of pieces of data 28 used as correct data in learning of the neural network NN1 is referred to as a data set 29. Note that the data 26 input to the neural network NN1 in Step S3 may be different from the data 26 input to the neural network NN1 in Step S2_2*b*.

Through the above, a weight coefficient 11_*i*+1 of the neural network NN1 can be acquired. Specifically, the weight coefficient 11_*i* is optimized, whereby the weight coefficient 11_*i*+1 can be acquired. For example, the neural network NN1 can acquire the weight coefficient 11_*i*+1 that allows output data from the neural network NN1 to which the data 26 has been input to match the data 28 corresponding to the data 26. Specifically, it is possible to acquire the weight coefficient 11_*i*+1 that enables a minimum error between the output data from the neural network NN1 to which the data 26 has been input and the data 28 that is correct data, by a gradient descent method using an error function, for example.

As described above, the neural network NN2 holds the weight coefficient 12 acquired in the last step, Step S2. Thus, the data 26 input to the neural network NN1 is also subjected to processing by the neural network NN2. Accordingly, the weight coefficient 11_*i*+1 acquired by the neural network NN1 in Step S3 can be a weight coefficient in which the weight coefficient 12 held in the neural network NN2 is reflected. In the above description, the weight coefficient 12 is not acquired by Step S3, that is, the weight coefficient 12 acquired in the last step, Step S2, is not optimized in Step S3; one embodiment of the present invention is not limited thereto. For example, in Step S3, both the weight coefficient 11 and the weight coefficient 12 may be optimized.

Although FIG. 5 illustrates a case where learning of the neural network NN1 is performed with supervised learning, unsupervised learning may be performed for the learning of the neural network NN1. In the case where the learning of the neural network NN1 is performed with unsupervised learning, the data 28 that is correct data is not necessarily input to the neural network NN1.

[Step S4]

Figure 6:
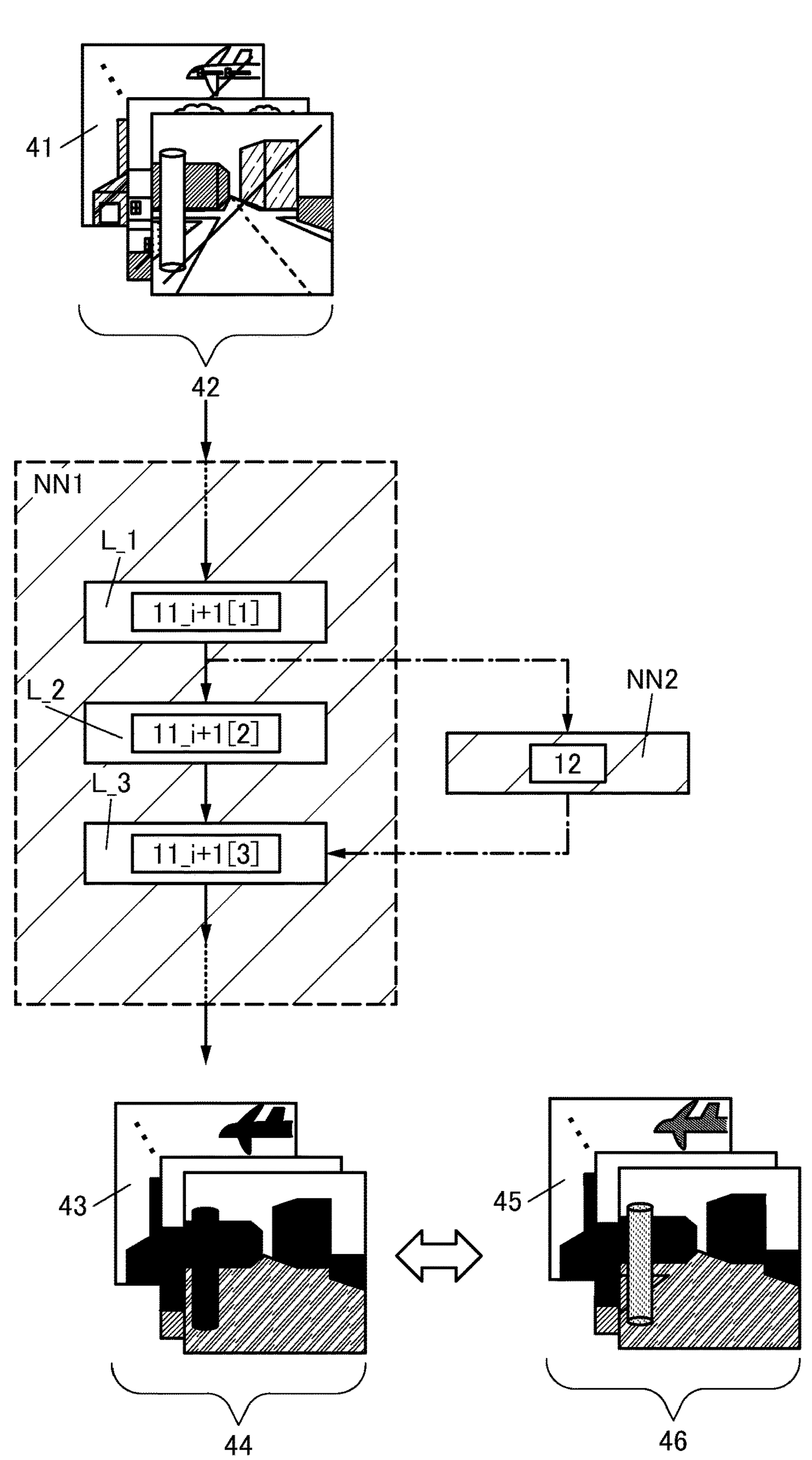
FIG. 6 is a diagram illustrating an example of a learning method of a neural network model.

Next, data 41 is input to the neural network NN1 as test data, and the inference accuracy of the neural network model 10 is evaluated on the basis of output data 43 output from the neural network NN1 (Step S4). FIG. 6 is a schematic view illustrating an example of processing in Step S4.

For example, the output data 43 is compared with data 45 representing a desired object as a result of segmentation of the data 41, and on the basis of a difference between the output data 43 and the data 45, the inference accuracy of the neural network model 10 is evaluated. For example, assuming that matrices representing the output data 43 and the data 45 have the equal numbers of rows and columns, the inference accuracy evaluation of the neural network model 10 is based on a difference between elements of the matrix for the output data 43 and elements of the matrix for the data 45.

For example, assuming that the output data 43 and the data 45 are each represented by a matrix with p rows and q columns (p and q are each an integer greater than or equal to 1), first, whether or not an element in the first row and the first column of the output data 43 matches an element in the first row and the first column of the data 45 is determined. Similarly, for all of the other elements, whether or not the data 43 matches the data 45 is determined. After that, the number of matched elements is divided by the number of all elements of the matrices (p×q), and a calculated value is regarded as an accuracy rate. On the basis of the accuracy rate, the inference accuracy of the neural network model 10 is evaluated. As the accuracy rate is higher, the inference accuracy can be evaluated to be higher.

Alternatively, the evaluation of the interference accuracy of the neural network model 10 may be based on an error function. Furthermore, when the learning of the neural network model 10 is performed so as to make the neural network NN1 have a function of performing segmentation on data input to the neural network NN1, the inference accuracy of the neural network model 10 can be evaluated on the basis of mIoU (mean Intersection over Union).

Alternatively, for example, assuming that the output data 43 and the data 45 are each represented by a matrix with p rows and q columns, first, the absolute value of a difference between an element in the first row and the first column of the output data 43 and an element in the first row and the first column of the data 45 is calculated. Similarly, for all of the other elements, each absolute value of a difference between the output data 43 and the data 45 is calculated. After that, the total of p×q calculated absolute values of the differences is calculated, and the inference accuracy of the neural network model 10 is evaluated on the basis of the total value. As the total value is smaller, the error between the output data 43 and the data 45 is determined to be smaller, that is, the inference accuracy is evaluated to be higher. This method can be suitably used in the case of performing learning of the neural network model 10 so as to make the neural network NN1 have a function of performing depth estimation on data input to the neural network NN1, for example.

Alternatively, when learning of the neural network model 10 is performed to make the neural network NN1 have a function of colorizing monochrome image data input to the neural network NN1, for example, the inference accuracy can be evaluated on the basis of the color space. For example, the HSV color space of the output data 43 is compared with that of the data 45, whereby the interference accuracy of the neural network model 10 can be evaluated. Here, the HSV color space is a color space in which a hue, saturation, and brightness of an image expressed by image data are quantified. Alternatively, an RGB color space, a CMY color space, an HLS color space, or the like may be used to evaluate the interference accuracy.

Note that a plurality of pieces of the data 41 that is test data can be prepared. In that case, an aggregate of the data 41 is referred to as a data set 42. When a plurality of pieces of the data 41 are prepared, a plurality of pieces of output data 43 and a plurality of pieces of data 45 are to be prepared. For example, the output data 43 whose quantity is equal to that of the data 41 and the data 45 whose quantity is equal to that of the data 41 are to be prepared. When a plurality of pieces of the output data 43 and a plurality of pieces of the data 45 are prepared, an aggregate of the output data 43 is referred to as a data set 44, and an aggregate of the data 45 is referred to as data 46. When a plurality of pieces of the data 41 are used to evaluate the interference accuracy of the neural network model 10, for example, each of the plurality of pieces of the data 41 is input to the neural network NN1, and the interference accuracy of each piece of the data 41 is calculated. The average value of the calculated interference accuracy of the data 41 can be the interference accuracy of the neural network model 10 used in the next step.

[Step S5]

After that, whether or not the interference accuracy of the neural network model 10 evaluated in Step S4 is higher than or equal to a predetermined value is determined (Step S5). When the interference accuracy is higher than or equal to the predetermined value, the learning of the neural network model 10 is terminated. When the interference accuracy is lower than the predetermined value, the value, 1, is added to i, and Step S2 to Step S5 are repeated. In other words, until the interference accuracy is higher than or equal to the predetermined value, the optimization of the weight coefficient 12 by the first learning and the optimization of the weight coefficient 11 by the second learning are performed. The above is an example of the learning method of the neural network model 10. Note that in Step S5, an increment of the interference accuracy by performing the first learning and the second learning may be evaluated, and the learning of the neural network model 10 may be terminated when the increment is higher than or equal to a predetermined value. For example, a difference of the interference accuracy in the following cases may be evaluated. One of the cases is to perform each of the first learning and the second learning j times (j is an integer greater than or equal to 1), and the other case is to perform each of the first learning and the second learning j+1 times. When the difference is lower than or equal to a predetermined value, the learning of the neural network model 10 may be terminated.

<Neural Network Mode_2>

Figure 7:
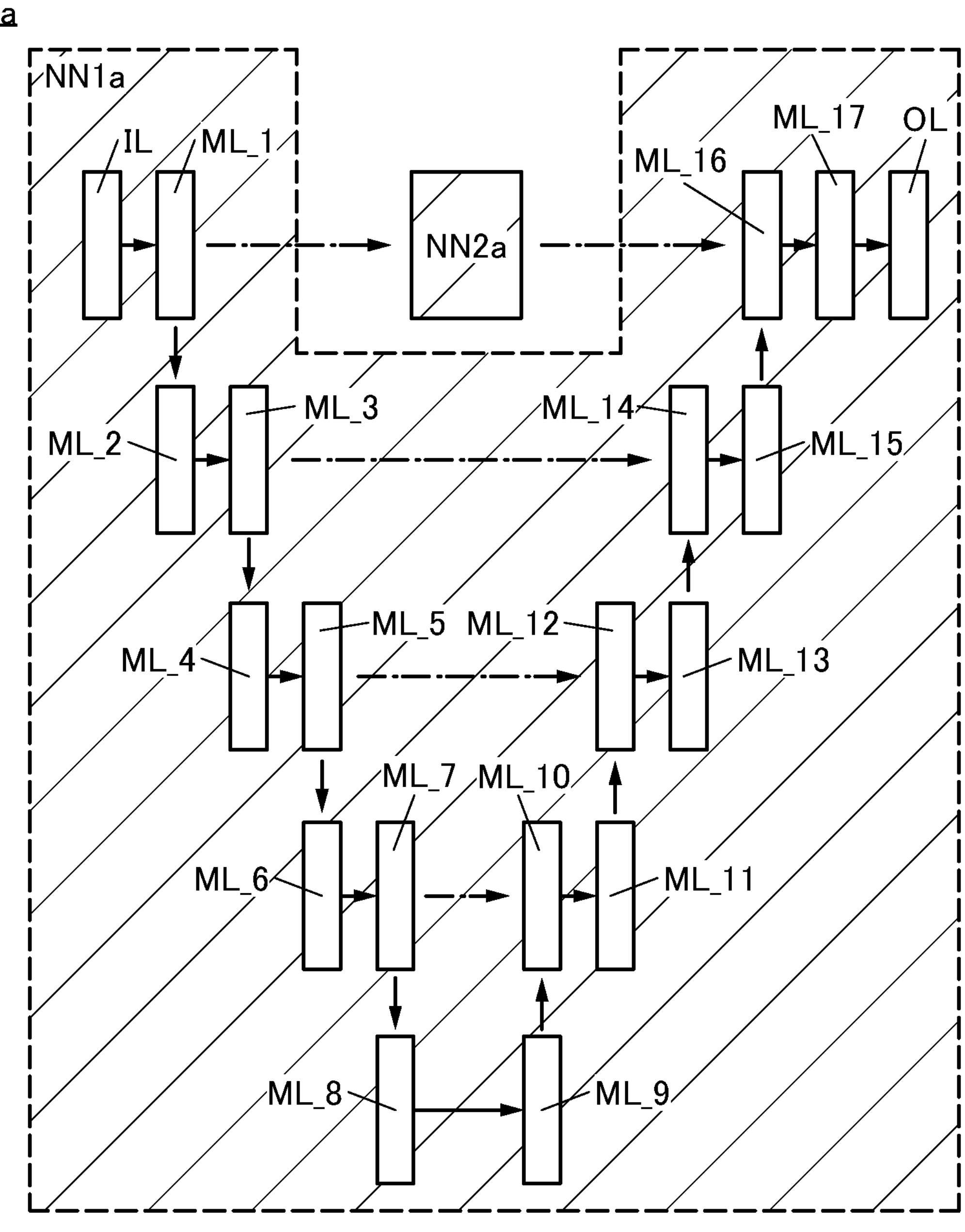
FIG. 7 is a diagram illustrating a structure example of a neural network model.

FIG. 7 illustrates a structure example of a neural network model 10*a* that is a neural network model of one embodiment of the present invention. The neural network model 10*a* includes a neural network NN1*a* and a neural network NN2*a*. The neural network NN1*a* has a function similar to that of the neural network NN1, and the neural network NN2*a* has a function similar to that of the neural network NN2. The neural network model 10*a* can perform learning with a procedure similar to that for the neural network model 10.

In this specification and the like, the neural network model 10 includes the neural network model 10*a* in some cases. In addition, the neural network NN1 includes the neural network NN1*a* in some cases, and the neural network NN2 includes the neural network NN2*a* in some cases.

The neural network NN1*a* includes an input layer IL, an intermediate layer ML_1 to an intermediate layer ML_17, and an output layer OL. The architecture of the neural network NN1*a* can be U-Net, for example. Alternatively, the architecture may be DenseNet, for example.

In the neural network NN1*a* in the structure illustrated in FIG. 7, a feature map output from the input layer IL is input to the intermediate layer ML_1, and a feature map output from the intermediate layer ML_1 is input to the intermediate layer ML_2. In this manner, data input to the input layer IL is transmitted sequentially to the intermediate layer ML_1 to the intermediate layer ML_17. Then, a feature map output from the intermediate layer ML_17 is input to the output layer OL. From the above, it can be found that among the intermediate layer ML_1 to the intermediate layer ML_17, the intermediate layer ML_1 is the closest to the input layer IL and the intermediate layer ML_2 to the intermediate layer ML_16 in this order are away from the input layer IL, that is, close to the output layer OL. It can be said that the intermediate layer ML_17 is the closest to the output layer OL.

The feature map output from the intermediate layer ML_1 is input not only to the intermediate layer ML_2 but also to the neural network NN2*a*. A feature map output from the neural network NN2*a* is input to the intermediate layer ML_16. That is, to the intermediate layer ML_16, the feature map output from the neural network NN2*a* as well as a feature map output from the intermediate layer ML_15 is input. Accordingly, it can be said that the intermediate layer ML_1 and the intermediate layer ML_16 are skip-connected via the neural network NN2*a*. Furthermore, it can be said that the intermediate layer ML_16 serves as a connected layer that connects the feature map output from the intermediate layer ML_15 and the feature map output from the neural network NN2*a*.

A feature map output from the intermediate layer ML_3 is input not only to the intermediate layer ML_4 but also to the intermediate layer ML_14. That is, to the intermediate layer ML_14, the feature map output from the intermediate layer ML_3 as well as a feather map output from the intermediate layer ML_13 is input. Thus, it can be said that the intermediate layer ML_3 and the intermediate layer ML_14 are skip-connected. Furthermore, it can be said that the intermediate layer ML_14 serves as a connected layer that connects the feature map output from the intermediate layer ML_13 and the feature map output from the intermediate layer ML_3.

A feature map output from the intermediate layer ML_5 is input not only to the intermediate layer ML_6 but also to the intermediate layer ML_12. That is, to the intermediate layer ML_12, the feature map output from the intermediate layer ML_5 as well as a feature map output from the intermediate layer ML_11 is input. Thus, it can be said that the intermediate layer ML_5 and the intermediate layer ML_12 are skip-connected. Furthermore, it can be said that the intermediate layer ML_12 serves as a connected layer that connects the feature map output from the intermediate layer ML_11 and the feature map output from the intermediate layer ML_5.

A feature map output from the intermediate layer ML_7 is input not only to the intermediate layer ML_8 but also to the intermediate layer ML_10. That is, to the intermediate layer ML_10, the feature map output from the intermediate layer ML_7 as well as a feature map output from the intermediate layer ML_9 is input. Thus, it can be said that the intermediate layer ML_7 and the intermediate layer ML_10 are skip-connected. Furthermore, it can be said that the intermediate layer ML_10 serves as a connected layer that connects the feature map output from the intermediate layer ML_9 and the feature map output from the intermediate layer ML_7.

From the above, it can be said that the neural network NN1*a* illustrated in FIG. 7 includes four pairs of skip-connected layers. Furthermore, it can be said that, of the intermediate layers ML having skip connection, the intermediate layer ML_1 the closest to the input layer IL is skip-connected to the intermediate layer ML_16 the closest to the output layer OL via the neural network NN2*a*.

For example, in U-Net, the feature map output from an intermediate layer close to the input layer is input to an intermediate layer close to the output layer by skip connection. Thus, when noise is included in data input to the input layer, the noise is likely to be transmitted to the layer close to the output layer. This may lead to an incapability of performing high-accurate inference on the data. By contrast, in the neural network NN1*a* with the structure illustrated in FIG. 7, for example, in the intermediate layers ML having skip connection, the intermediate layer ML_1 the closest to the input layer IL is skip-connected to the intermediate layer ML_16 the closest to the output layer OL via the neural network NN2*a* having a function of removing noise. Thus, even when data input to the input layer IL includes noise, the noise can be inhibited from being transmitted to the layer close to the output layer OL. Consequently, the neural network NN1*a* can perform the interference of the data with high accuracy.

In proportion as the feature extraction is performed by the intermediate layers ML, the influence of noise included in the data input to the input layer IL is decreased. For example, when data including noise is input to the input layer IL, the noise less affects the feature map output from the intermediate layer ML_7 than the feature map output from the intermediate layer ML_1. Thus, when the feature map output from the intermediate layer ML far from the input layer IL is input to another intermediate layer ML by skip connection, it is not necessary to perform noise removal on the feature map. For example, the intermediate layer ML_3, the intermediate layer ML_5, and the intermediate layer ML_7, which are farther from the input layer IL than the intermediate layer ML_1, can be skip-connected to the intermediate layer ML_14, the intermediate layer ML_12, and the intermediate layer ML_10, respectively, without the neural network having a function of noise removal. Consequently, even when the number of layers skip-connected increases, the accuracy of the inference of the data input to the input layer IL can be kept high while the scale of the neural network model 10 is inhibited from expanding.

FIG. 7 illustrates the structure in which neural network NN1*a* includes 17 intermediate layers ML out of which four pairs of skip-connected layers are included; however, one embodiment of the present invention is not limited to the structure. For example, the number of intermediate layers ML may be larger than 17. In addition, FIG. 7 illustrates the structure in which only the intermediate layer ML_1 and the intermediate layer ML_16 are skip-connected via the neural network having a function of noise removal; however, one embodiment of the present invention is not limited to the structure. For example, an applicable structure is such that, in addition to the intermediate layer ML_1 and the intermediate layer ML_16, layers skip-connected via the neural network having a function of noise removal are the intermediate layer ML_3 and the intermediate layer ML_14. The number of layers skip-connected via the neural network having a function of noise removal is increased, whereby the inference of the data input to the input layer IL can be performed with high accuracy.

<Structure Example of Arithmetic Processing System>

Figure 8A:
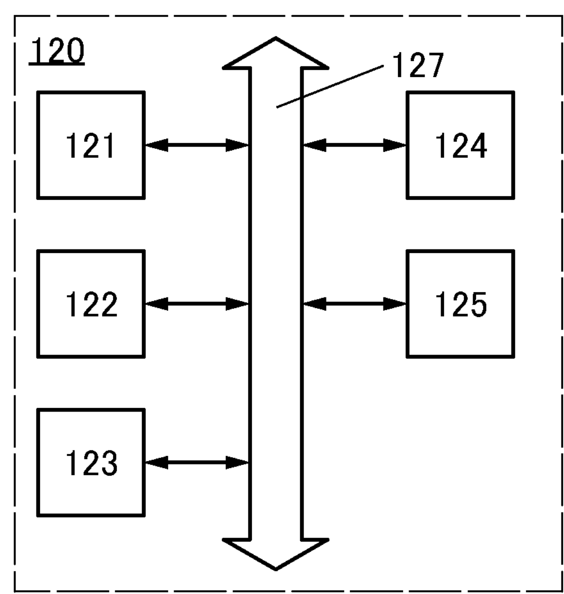
FIG. 8A and FIG. 8B are block diagrams illustrating structure examples of an arithmetic processing system.

The neural network model of one embodiment of the present invention can be applied to an arithmetic processing system, for example. FIG. 8A is a block diagram illustrating a structure example of an arithmetic processing system 100 to which the neural network model of one embodiment of the present invention can be applied. The arithmetic processing system 100 includes a data processing device 120.

The data processing device 120 includes an imaging portion 121, an output portion 122, an arithmetic portion 123, a main storage portion 124, and an auxiliary storage portion 125. Data or the like can be transmitted between the components included in the data processing device 120 through a transmission path 127. In this specification and the like, an imaging portion can be referred to as an imaging device.

The imaging portion 121 has a function of performing imaging to acquire image data. The image data can be used as the data 21 shown in FIG. 3A. The output portion 122 has a function of supplying information.

The arithmetic portion 123 has a function of performing arithmetic processing. The arithmetic portion 123 has a function of performing predetermined arithmetic processing on data transmitted to the arithmetic portion 123 from the imaging portion 121, the main storage portion 124, the auxiliary storage portion 125, or the like through the transmission path 127, for example. The arithmetic portion 123 can include, for example, a CPU (Central Processing Unit), a GPU (Graphics Processing Unit), and the like.

The main storage portion 124 has a function of storing data, a program, and the like. The arithmetic portion 123 can execute arithmetic processing by reading data, a program, and the like stored in the main storage portion 124. For example, the arithmetic portion 123 can execute predetermined arithmetic processing on data read from the main storage portion 124 by executing a program read from the main storage portion 124.

The main storage portion 124 preferably operates at higher speed than the auxiliary storage portion 125. The main storage portion 124 can include a DRAM (Dynamic Random Access Memory), an SRAM (Static Random Access Memory), or the like, for example.

The auxiliary storage portion 125 has a function of storing data, a program, and the like for a longer time than the main storage portion 124. The auxiliary storage portion 125 can include an HDD (Hard Disk Drive), an SSD (Solid State Drive), or the like, for example. In addition, the auxiliary storage portion 125 may include a nonvolatile memory such as an ReRAM (Resistive Random Access Memory, also referred to as a resistance-change memory), a PRAM (Phase change Random Access Memory), an FeRAM (Ferroelectric Random Access Memory), an MRAM (Magnetoresistive Random Access Memory, also referred to a magneto-resistive memory), or a flash memory.

The weight coefficient 11 and the weight coefficient 12 acquired with learning of the neural network model of one embodiment of the present invention are stored in the auxiliary storage portion 125. Note that the weight coefficient 11 and the weight coefficient 12 may be stored in the main storage portion 124.

The data processing device 120 can be provided in an information terminal such as a smartphone, a tablet, or a personal computer, for example.

Figure 8B:
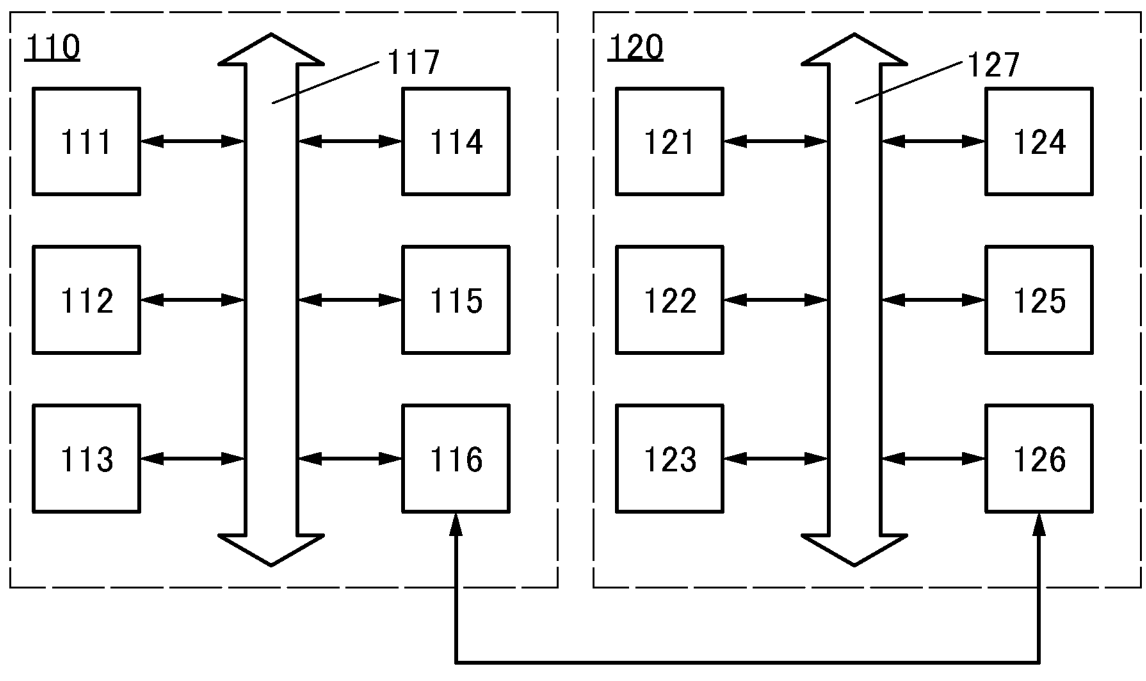

Note that the structure of the arithmetic processing system 100 is not limited to the above. For example, as illustrated in FIG. 8B, the arithmetic processing system 100 may include a data processing device 110 in addition to the data processing device 120.

The data processing device 110 includes an imaging portion 111, an output portion 112, an arithmetic portion 113, a main storage portion 114, an auxiliary storage portion 115, and a communication portion 116. Data or the like can be transmitted between the components included in the data processing device 110 through a transmission path 117.

The imaging portion 111 has a function of performing imaging to acquire image data. The image data can be used as the data 21 shown in FIG. 3A. The output portion 112 has a function of supplying information.

The arithmetic portion 113 has a function of performing arithmetic processing. The arithmetic portion 113 has a function of performing predetermined arithmetic processing, for example, on data transmitted to the arithmetic portion 113 from the imaging portion 111, the main storage portion 114, the auxiliary storage portion 115, the communication portion 116, or the like through the transmission path 117. For example, the arithmetic portion 113 can include a CPU, a GPU, and the like.

The main storage portion 114 has a function of storing data, a program, and the like. The arithmetic portion 113 can execute arithmetic processing by reading data, a program, and the like stored in the main storage portion 114. For example, the arithmetic portion 113 can execute predetermined arithmetic processing on data read from the main storage portion 114 by executing a program read from the main storage portion 114.

The main storage portion 114 preferably operates at higher speed than the auxiliary storage portion 115. The main storage portion 114 can include a DRAM, an SRAM, or the like, for example.

The auxiliary storage portion 115 has a function of storing data, a program, and the like for a longer time than the main storage portion 114. The auxiliary storage portion 115 can include an HDD, an SSD, or the like, for example. In addition, the auxiliary storage portion 115 may include a nonvolatile memory such as an ReRAM, a PRAM, an FeRAM, an MRAM, or a flash memory.

The weight coefficient 11 and the weight coefficient 12 acquired with learning of the neural network model of one embodiment of the present invention are stored in the auxiliary storage portion 115. Note that the weight coefficient 11 and the weight coefficient 12 may be stored in the main storage portion 114.

The communication portion 116 has a function of transmitting and receiving data or the like to and from a device or the like that is provided outside the data processing device 110. In addition, the communication portion 116 can have a function of supplying data or the like to a network and a function of acquiring the data or the like from the network.

The data processing device 120 includes the imaging portion 121, the output portion 122, the arithmetic portion 123, the main storage portion 124, the auxiliary storage portion 125, and a communication portion 126. Note that the above description can be referred to for the description of the data processing device 120 and the components included in the data processing device 120.

The communication portion 126 has a function of transmitting and receiving data or the like to and from a device or the like that is provided outside the data processing device 120. In addition, the communication portion 126 can have a function of supplying data or the like to a network and a function of acquiring the data or the like from the network.

The arithmetic portion 123 has a function of performing predetermined arithmetic processing, for example, on data transmitted to the arithmetic portion 123 from the imaging portion 121, the main storage portion 124, the auxiliary storage portion 125, the communication portion 126, or the like through the transmission path 127.

In the case where the neural network model of one embodiment of the present invention is employed for the arithmetic portion 113 and the arithmetic portion 123, for example, the weight coefficient 11 and the weight coefficient 12 can be acquired with learning performed by the arithmetic portion 113 and can be supplied from the data processing device 110 to the data processing device 120. Consequently, even when the arithmetic portion 123 included in the data processing device 120 does not perform learning, the arithmetic processing by the neural network model can be performed on the data input to the arithmetic portion 123 on the basis of the weight coefficient 11 and the weight coefficient 12 acquired by the arithmetic portion 113. Consequently, the arithmetic throughput of the arithmetic portion 123 can be made lower than that of the arithmetic portion 113.

When the arithmetic portion 113 obtains the weight coefficient 11 and the weight coefficient 12 and supplied them from the data processing device 110 to the data processing device 120, the data processing device 110 can be provided in, for example, a server. Note that in the case where the data processing device 110 is provided in the server, the imaging portion 111 and the output portion 112 are not necessarily provided in the data processing device 110. In other words, the imaging portion 111 and the output portion 112 may be provided outside the data processing device 110.

In addition, as described above, the data processing device 120 can be provided in an information terminal such as a smartphone, a tablet, or a personal computer, for example. Furthermore, both at least part of the components in the data processing device 110 and at least part of the components in the data processing device 120 may be provided in the server. For example, the arithmetic portion 113 and the arithmetic portion 123 may be provided in the server. In that case, for example, data acquired by the information terminal is supplied to the arithmetic portion 123 through the network, and the arithmetic portion 123 provided in the server performs estimation or the like on the data. Then, an estimation result is supplied to the information terminal through the network, so that the information terminal can acquire the estimation result.

When the arithmetic processing system 100 has the structure illustrated in FIG. 8B and the arithmetic portion 113 performs learning to acquire the weight coefficient 11 and the weight coefficient 12, the data 21 illustrated in FIG. 3A is not necessarily acquired by the imaging portion 111. For example, the imaging portion 121 may capture an image to acquire image data that is to be the data 21 and supply the image data to the data processing device 110 from the data processing device 120. In that case, the imaging portion 111 is not necessarily provided in the data processing device 110.

<Structure Example of Imaging Portion>

Figure 9:
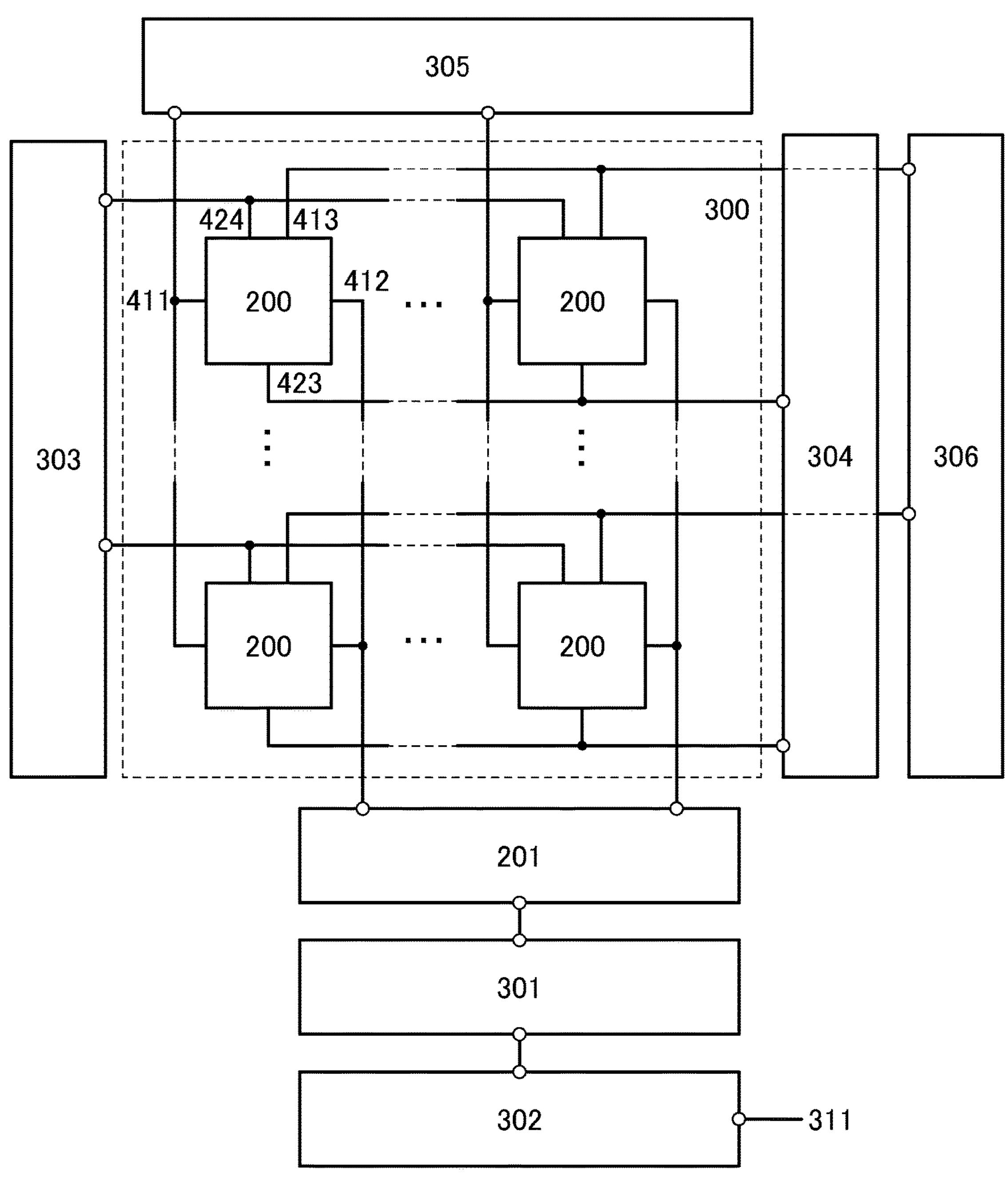
FIG. 9 is a block diagram illustrating a structure example of an imaging portion.

FIG. 9 is a block diagram illustrating a structure example of the imaging portion 111 and the imaging portion 121. The imaging portion includes a pixel array 300, a circuit 201, a circuit 301, a circuit 302, a circuit 303, a circuit 304, a circuit 305, and a circuit 306. Note that each of the structures of the circuit 201 and the circuit 301 to the circuit 306 is not limited to a single circuit structure and is sometimes composed of a combination of a plurality of circuits. Alternatively, any of the plurality of circuits described above may be combined. Furthermore, a circuit other than the above circuits may be connected. The circuit 201, the circuit 301, the circuit 302, the circuit 303, the circuit 304, the circuit 305, and the circuit 306 may be provided in the arithmetic portion 113 or the arithmetic portion 123.

The pixel array 300 has an imaging function and an arithmetic function. The circuit 201 and the circuit 301 each have an arithmetic function. The circuit 302 has an arithmetic function or a data conversion function. The circuit 303, the circuit 304, and the circuit 306 each have a selection function. The circuit 303 is electrically connected to the pixel block 200 through a wiring 424. The circuit 304 is electrically connected to a pixel block 200 through a wiring 423. The circuit 305 has a function of supplying a potential for product-sum operation to a pixel. As a circuit having a selection function, a shift register, a decoder, or the like can be used. The circuit 306 is electrically connected to the pixel block 200 through a wiring 413. Note that the circuit 301 and the circuit 302 may be provided outside.

Figure 10:
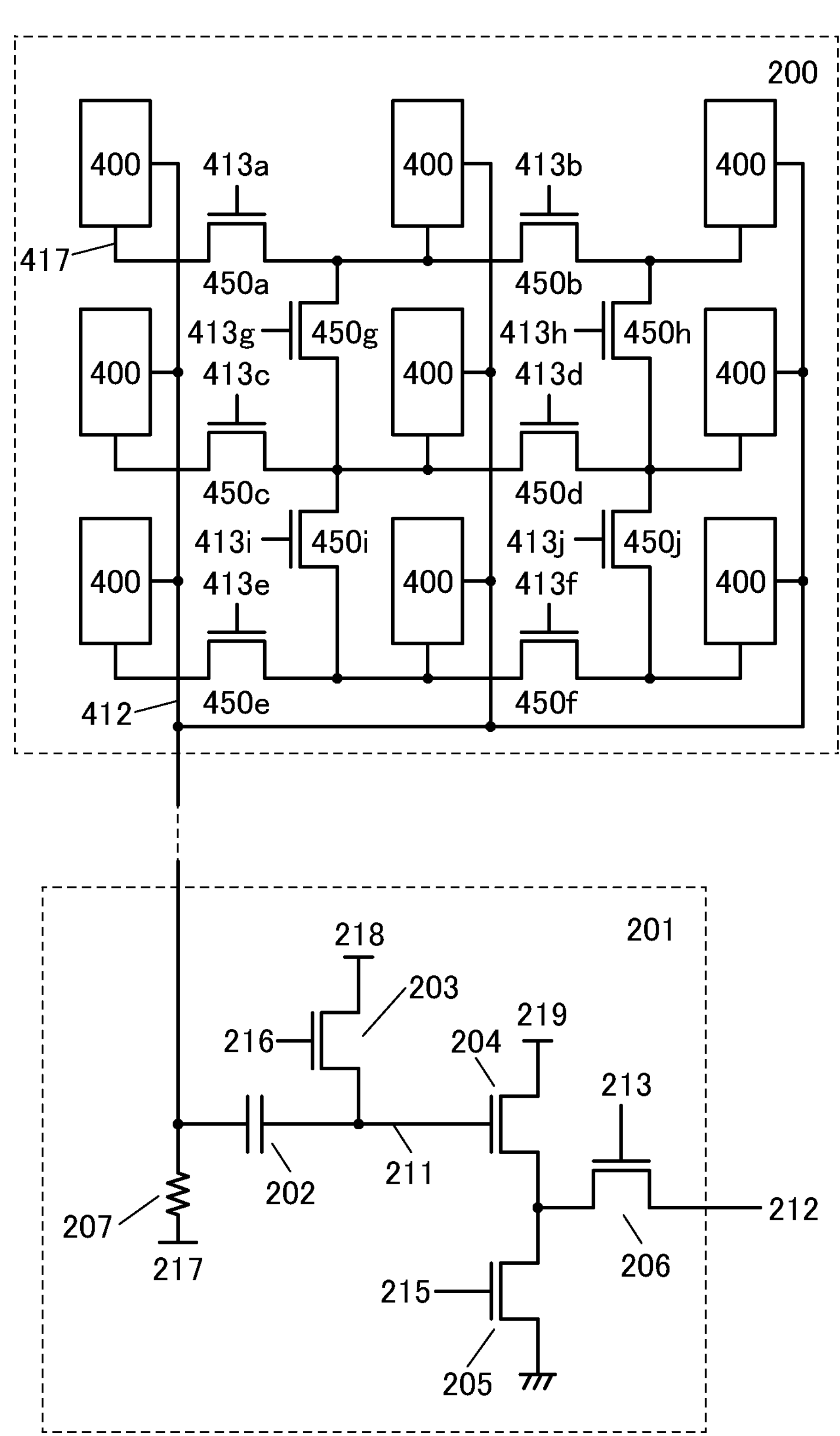
FIG. 10 is a diagram illustrating a structure example of a pixel block 200 and a circuit 201.

The pixel array 300 includes a plurality of pixel blocks 200. As illustrated in FIG. 10, the pixel block 200 includes a plurality of pixels 400 arranged in a matrix, and each of the pixels 400 is electrically connected to the circuit 201 through a wiring 412. Note that the circuit 201 can also be provided in the pixel block 200.

Furthermore, the pixel 400 is electrically connected to an adjacent pixel 400 through a transistor 450 (transistors 450*a* to 450*f*). The functions of the transistors 450 are described later.

The pixels 400 can acquire image data and generate data obtained by adding the image data and a weight coefficient. Note that the number of pixels included in the pixel block 200 is 3×3 in an example illustrated in FIG. 10 but is not limited to this. For example, the number of pixels can be 2×2, 4×4, or the like. Alternatively, the number of pixels in a horizontal direction and the number of pixels in a vertical direction may differ from each other. Furthermore, some pixels may be shared by adjacent pixel blocks.

The pixel block 200 and the circuit 201 can operate as a product-sum operation circuit.

Figure 11:
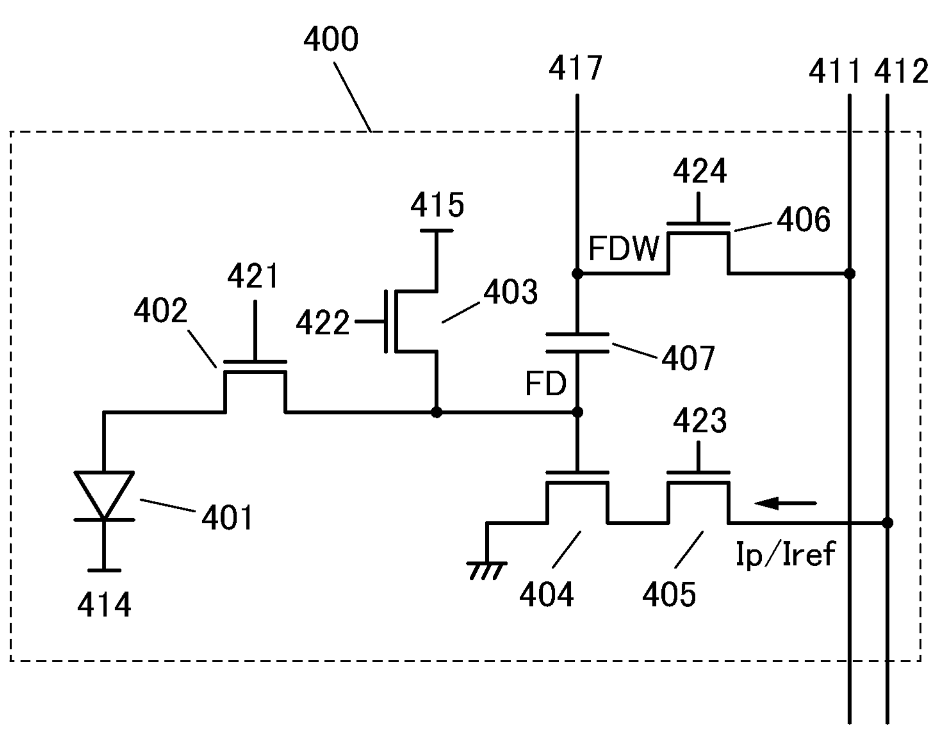
FIG. 11 is a diagram illustrating a structure example of a pixel.

As illustrated in FIG. 11, the pixel 400 can include a photoelectric conversion device 401, a transistor 402, a transistor 403, a transistor 404, a transistor 405, a transistor 406, and a capacitor 407.

One electrode of the photoelectric conversion device 401 is electrically connected to one of a source and a drain of the transistor 402. The other of the source and the drain of the transistor 402 is electrically connected to one of a source and a drain of the transistor 403, a gate of the transistor 404, and one electrode of the capacitor 407. One of a source and a drain of the transistor 404 is electrically connected to one of a source and a drain of the transistor 405. The other electrode of the capacitor 407 is electrically connected to one of a source and a drain of the transistor 406.

The other electrode of the photoelectric conversion device 401 is electrically connected to a wiring 414. The other of the source and the drain of the transistor 403 is electrically connected to a wiring 415. The other of the source and the drain of the transistor 405 is electrically connected to a wiring 412. The other of the source and the drain of the transistor 404 is electrically connected to a GND wiring or the like. The other of the source and the drain of the transistor 406 is electrically connected to a wiring 411. The other electrode of the capacitor 407 is electrically connected to a wiring 417.

A gate of the transistor 402 is electrically connected to a wiring 421. A gate of the transistor 403 is electrically connected to a wiring 422. A gate of the transistor 405 is electrically connected to a wiring 423. A gate of the transistor 406 is electrically connected to the wiring 424.

Here, a point where the other of the source and the drain of the transistor 402, the one of the source and the drain of the transistor 403, the one electrode of the capacitor 407, and the gate of the transistor 404 are electrically connected is referred to as a node FD. Furthermore, a point where the other electrode of the capacitor 407 and the one of the source and the drain of the transistor 406 are electrically connected is referred to as a node FDW.

The wiring 414 and the wiring 415 can each have a function of a power supply line. For example, the wiring 414 can function as a high potential power supply line, and the wiring 415 can function as a low potential power supply line. The wiring 421, the wiring 422, the wiring 423, and the wiring 424 can function as signal lines that control the conduction of the respective transistors. The wiring 411 can function as a wiring for supplying a potential corresponding to a weight coefficient to the pixel 400. The wiring 412 can function as a wiring that electrically connects the pixel 400 and the circuit 201. The wiring 417 can function as a wiring that electrically connects the other electrode of the capacitor 407 of the pixel and the other electrode of the capacitor 407 of another pixel through the transistor 450 (see FIG. 10).

Note that an amplifier circuit or a gain control circuit may be electrically connected to the wiring 412.

As the photoelectric conversion device 401, a photodiode can be used. There is no limitation on types of photodiodes, and it is possible to use a Si photodiode in which a photoelectric conversion layer contains silicon, an organic photodiode in which a photoelectric conversion layer includes an organic photoconductive film, or the like. Note that in order to increase light detection sensitivity under low illuminance conditions, an avalanche photodiode is preferably used.

The transistor 402 can have a function of controlling the potential of the node FD. The transistor 403 can have a function of initializing the potential of the node FD. The transistor 404 can have a function of controlling current fed by the circuit 201 in accordance with the potential of the node FD. The transistor 405 can have a function of selecting a pixel. The transistor 406 can have a function of supplying the potential corresponding to the weight coefficient to the node FDW.

In the case where an avalanche photodiode is used as the photoelectric conversion device 401, high voltage is sometimes applied and thus a transistor with high breakdown voltage is preferably used as a transistor connected to the photoelectric conversion device 401. As the transistor with high breakdown voltage, a transistor using a metal oxide in its channel formation region (hereinafter an OS transistor) or the like can be used, for example. Specifically, an OS transistor is preferably employed as the transistor 402.

An OS transistor also has a feature of extremely low off-state current. When OS transistors are used as the transistor 402, the transistor 403, and the transistor 406, a period during which charge can be retained at the node FD and the node FDW can be elongated greatly. Therefore, a global shutter mode in which charge accumulation operation is performed in all the pixels at the same time can be employed without complicating the circuit structure and the operation method. Furthermore, while image data is retained at the node FD, arithmetic operation using the image data can be performed more than once.

Meanwhile, it is sometimes desirable that the transistor 404 have excellent amplifying characteristics. In addition, a transistor having high mobility capable of high-speed operation is sometimes preferably used as the transistor 406. Accordingly, transistors using silicon in their channel formation regions (hereinafter Si transistors) may be employed as the transistor 404 and the transistor 406.

Note that without limitation to the above, an OS transistor and a Si transistor may be freely employed in combination. Alternatively, all the transistors may be OS transistors. Alternatively, all the transistors may be Si transistors. Examples of the Si transistor include a transistor including amorphous silicon and a transistor including crystalline silicon (microcrystalline silicon, low-temperature polysilicon, or single crystal silicon).

The potential of the node FD in the pixel 400 is determined by the potential obtained by adding a reset potential supplied from the wiring 415 and a potential (image data) generated by photoelectric conversion by the photoelectric conversion device 401. Alternatively, the potential of the node FD in the pixel 400 is determined by capacitive coupling of the potential corresponding to a weight coefficient supplied from the wiring 411. Thus, current corresponding to data in which a given weight coefficient is added to the image data can flow through the transistor 405.

Note that the circuit structures of the pixel 400 described above are examples, and the photoelectric conversion operation can also be performed with other circuit structures.

As illustrated in FIG. 10, the pixels 400 are electrically connected to each other through the wiring 412. The circuit 201 can perform arithmetic operation using the sum of currents flowing through the transistors 404 of the pixels 400.

The circuit 201 includes a capacitor 202, a transistor 203, a transistor 204, a transistor 205, a transistor 206, and a resistor 207.

One electrode of the capacitor 202 is electrically connected to one of a source and a drain of the transistor 203. The one of the source and the drain of the transistor 203 is electrically connected to a gate of the transistor 204. One of a source and a drain of the transistor 204 is electrically connected to one of a source and a drain of the transistor 205. The one of the source and the drain of the transistor 205 is electrically connected to one of a source and a drain of the transistor 206. One electrode of the resistor 207 is electrically connected to the other electrode of the capacitor 202.

The other electrode of the capacitor 202 is electrically connected to the wiring 412. The other of the source and the drain of the transistor 203 is electrically connected to a wiring 218. The other of the source and the drain of the transistor 204 is electrically connected to a wiring 219. The other of the source and the drain of the transistor 205 is electrically connected to a reference power supply line such as a GND wiring. The other of the source and the drain of the transistor 206 is electrically connected to a wiring 212. The other electrode of the resistor 207 is electrically connected to a wiring 217.

The wiring 217, the wiring 218, and the wiring 219 can each have a function of a power supply line. For example, the wiring 218 can have a function of a wiring that supplies a potential dedicated to reading. The wiring 217 and the wiring 219 can function as high potential power supply lines. The wiring 213, the wiring 215, and the wiring 216 can function as signal lines for controlling the electrical conduction of the respective transistors. The wiring 212 is an output line and can be electrically connected to the circuit 301 illustrated in FIG. 9, for example.

The transistor 203 can have a function of resetting the potential of the wiring 211 to the potential of the wiring 218. The wiring 211 is a wiring that is electrically connected to the one electrode of the capacitor 202, the one of the source and the drain of the transistor 203, and the gate of the transistor 204. The transistor 204 and the transistor 205 can have a function of source follower circuits. The transistor 206 can have a function of controlling reading. The circuit 201 has a function of a correlated double sampling circuit (a CDS circuit) and can be replaced with a circuit having the function and another structure.

In one embodiment of the present invention, offset components other than the product of image data (X) and a weight coefficient (W) are eliminated, and an objective WX is extracted. WX can be calculated using data obtained when imaging is performed, data obtained when imaging is not performed, and data obtained by adding weights to the respective data.

The total amount of currents ($I_p$) flowing through the pixels 400 when imaging is performed is $k\Sigma(X-V_{th})^2$, and the total amount of currents ($I_p$) flowing through the pixels 400 when weights are added is $k\Sigma(W+X-V_{th})^2$. In addition, the total amount of currents ($I_{ref}$) flowing through the pixels 400 when imaging is not performed is $k\Sigma(0-V_{th})^2$, and the total amount of currents ($I_{ref}$) flowing through the pixels 400 when weights are added is $k\Sigma(W-V_{th})^2$. Here, k is a constant and $V_{th}$ is the threshold voltage of the transistor 405.

First, a difference (data A) between the data obtained when imaging is performed and the data obtained by adding a weight to the data is calculated. The difference is $k\Sigma((X-V_{th})^2-(W+X-V_{th})^2)=k\Sigma(-W^2-2W\cdot X+2W\cdot V_{th})$.

Next, a difference (data B) between the data obtained when imaging is not performed and the data obtained by adding a weight to the data is calculated. The difference is $k\Sigma((0-V_{th})^2-(W-V_{th})^2)=k\Sigma(-W^2+2W\cdot V_{th})$.

Then, a difference between the data A and the data B is calculated. The difference is $k\Sigma(-W^2-2W\cdot X+2W\cdot V_{th}-(-W^2+2W\cdot V_{th}))=k\Sigma(-2W\cdot X)$. That is, offset components other than the product of the image data (X) and the weight coefficient (W) can be eliminated.

The circuit 201 can read the data A and the data B. Note that the calculation of the difference between the data A and the data B can be performed by the circuit 301, for example.

Here, the weights supplied to the entire pixel block 200 function as a filter. As the filter, a convolutional filter of a convolutional neural network (CNN) can be used, for example. Alternatively, an image processing filter such as an edge extraction filter can be used. As examples of the edge extraction filter, a Laplacian filter illustrated in FIG. 12A, a Prewitt filter illustrated in FIG. 12B, a Sobel filter illustrated in FIG. 12C, and the like can be given.

In the case where the number of pixels 400 included in the pixel block 200 is 3×3, elements of the edge extraction filter can be assigned and supplied as weights to the pixels 400. As described above, to calculate the data A and the data B, data obtained when imaging is performed, data obtained when imaging is not performed, and data obtained by adding weights to the respective data can be utilized for the calculation. Here, the data obtained when imaging is performed and the data obtained when imaging is not performed are data to which weights are not added and can also be referred to as data obtained by adding a weight 0 to all the pixels 400.

The edge extraction filters illustrated as examples in FIG. 12A to FIG. 12C are filters where the sum ($\Sigma\Delta W/N$, where N is the number of elements) of elements (weights: $\Delta W$) is 0. Therefore, without additional operation of supplying $\Delta W=0$ from another circuit, the operation of obtaining $\Sigma\Delta W/N$ enables data corresponding to the data obtained by adding $\Delta W=0$ to all the pixels 400 to be acquired.

This operation corresponds to turning on the transistor 450 (the transistor 450*a* to the transistor 450*f*) provided between the pixels 400 (see FIG. 10). By turning on the transistor 450, the node FDW in each of the pixels 400 is short-circuited through the wiring 417. At this time, charge accumulated in the node FDW in each of the pixels 400 is redistributed, and in the case where the edge extraction filters illustrated as examples in FIG. 12A to FIG. 12C are used, the potential of the node FDW ($\Delta W$) becomes 0 or substantially 0. Thus, the data corresponding to the data obtained by adding $\Delta W=0$ can be acquired.

Note that in the case of rewriting weights ($\Delta W$) by supplying charge from a circuit outside the pixel array 300, it takes time to complete rewriting owing to the capacitance of the long-distance wiring 411 or the like. In contrast, the pixel block 200 is a minute region, and the wiring 417 has a short distance and small capacitance. Therefore, weights ($\Delta W$) can be rewritten at high speed by the operation of redistributing charge accumulated in the nodes FDW in the pixel block 200.

In the pixel block 200 illustrated in FIG. 10, a structure where the transistor 450*a* to the transistor 450*f* are electrically connected to different gate lines (a wiring 413*a* to a wiring **413*f*) is illustrated. With this structure, the conductions of the transistor 450*a* to the transistor 450*f*** can be controlled independently of each other, and the operation of obtaining $\Sigma\Delta W/N$ can be performed selectively.

For example, in the case of using a filter illustrated in FIG. 12B, FIG. 12C, or the like, there are some pixels where $\Delta W=0$ is initially supplied. Assuming that $\Sigma\Delta W/N=0$, the pixels where $\Delta W=0$ is supplied may be excluded from the target of summation. The exclusion of the pixels eliminates the need of supplying a potential for operating some of the transistor **450*a* to the transistor 450*f***, which can reduce power consumption.

Product-sum operation result data output from the circuit 201 is sequentially input to the circuit 301. The circuit 301 may have a variety of arithmetic functions in addition to the above-described function of calculating the difference between the data A and the data B. For example, the circuit 301 can have a structure similar to that of the circuit 201. Alternatively, the function of the circuit 301 may be replaced by software processing.

In addition, the circuit 301 may include a circuit that performs arithmetic operation of an activation function. A comparator circuit can be used as the circuit, for example. A comparator circuit outputs a result of comparing input data and a set threshold as binary data. In other words, the pixel blocks 200 and the circuit 301 can operate as some components of a neural network.

Data output from the circuit 301 is sequentially input to the circuit 302. The circuit 302 can have a structure including a latch circuit, a shift register, and the like, for example. With this structure, parallel-serial conversion can be performed and data input in parallel can be output to a wiring 311 as serial data.

Assuming that the neural network model 10 with the structure illustrated in FIG. 1A or FIG. 1B is used for the arithmetic portion 113 and the arithmetic portion 123, for example, data output from the wiring 311 can be input to the layer L_1. Thus, the layer L_1 can serve as an input layer of the neural network NN1. When the neural network model 10 with the structure illustrated in FIG. 1A or FIG. 1B performs learning, data output from the wiring 311 can be used as the data 21 shown in FIG. 3A, and data obtained by adding noise to the data 21 can be used as the data 22. The noise can be, for example, Gaussian noise. Accordingly, the above-described structure can inhibit a noise-induced decrease in the inference accuracy of the neural network model used for the arithmetic portion 113 and the arithmetic portion 123 even when data output from the wiring 311 includes noise.

[Pixel Structure Example]

Figure 13A:
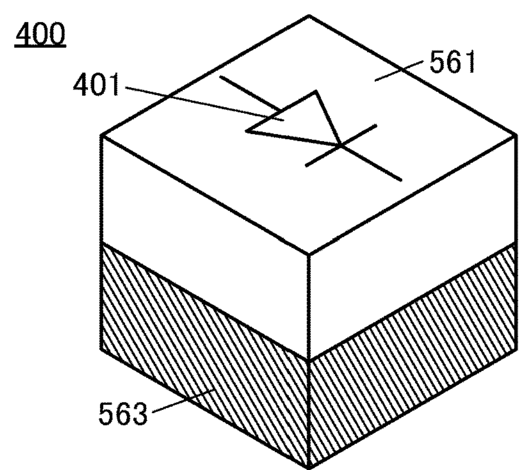
FIG. 13A is a diagram illustrating a structure example of a pixel.

FIG. 13A illustrates a structure example of the pixel 400. The pixel 400 can have a stacked-layer structure of a layer 561 and a layer 563.

The layer 561 includes the photoelectric conversion device 401. The photoelectric conversion device 401 can include a layer **565*a* and a layer 565*b* as illustrated in FIG. 13**B. Note that the term "layer" may be replaced with the term "region" in some cases.

Figure 13B:
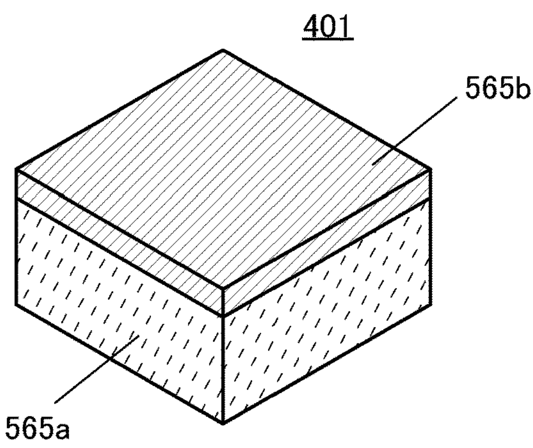
FIG. 13B to FIG. 13D are diagrams illustrating structure examples of a photoelectric conversion device.

The photoelectric conversion device 401 illustrated in FIG. 13B is a pn-junction photodiode; for example, a p-type semiconductor can be used for the layer **565*a*, and an n-type semiconductor can be used for the layer 565*b*. Alternatively, an n-type semiconductor may be used for the layer 565*a*, and a p-type semiconductor may be used for the layer 565*b***.

The pn-junction photodiode can be typically formed using single crystal silicon.

Figure 13C:
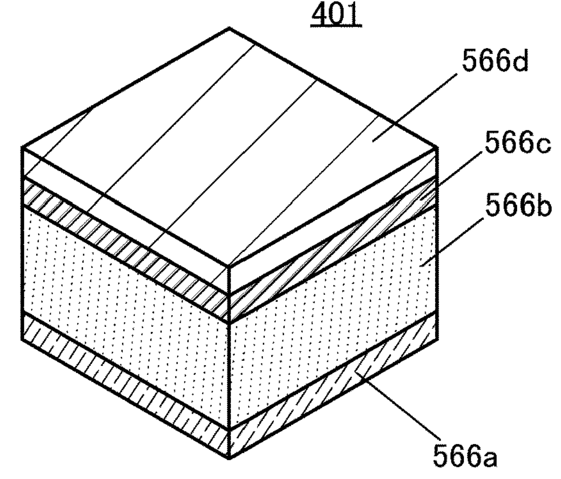

The photoelectric conversion device 401 included in the layer 561 may have a stacked-layer structure of a layer **566*a*, a layer 566*b*, a layer 566*c*, and a layer 566*d* as illustrated in FIG. 13C. The photoelectric conversion device 401 illustrated in FIG. 13C is an example of an avalanche photodiode; the layer 566*a* and the layer 566*d* correspond to electrodes, and the layer 566*b* and the layer 566*c*** correspond to a photoelectric conversion portion.

The layer **566*a*** is preferably a low-resistance metal layer or the like. For example, aluminum, titanium, tungsten, tantalum, silver, or a stacked layer thereof can be used.

A conductive layer having a high light-transmitting property with respect to visible light is preferably used as the layer **566*d*. For example, indium oxide, tin oxide, zinc oxide, indium tin oxide, gallium zinc oxide, indium gallium zinc oxide, graphene, or the like can be used. Note that a structure in which the layer 566*d*** is omitted can also be employed.

The layer **566*b* and the layer 566*c* of the photoelectric conversion portion can be used to form a pn-junction photodiode containing a selenium-based material in a photoelectric conversion layer, for example. A selenium-based material, which is a p-type semiconductor, is preferably used for the layer 566*b*, and gallium oxide or the like, which is an n-type semiconductor, is preferably used for the layer 566*c***.

A photoelectric conversion device containing a selenium-based material has characteristics of high external quantum efficiency with respect to visible light. In the photoelectric conversion device, electrons can be greatly amplified with respect to the amount of incident light by utilizing the avalanche multiplication. A selenium-based material has a high light-absorption coefficient and thus has advantages in production; for example, a photoelectric conversion layer can be manufactured using a thin film. A thin film of a selenium-based material can be formed by a vacuum evaporation method, a sputtering method, or the like.

As a selenium-based material, crystalline selenium such as single crystal selenium or polycrystalline selenium, amorphous selenium, a compound of copper, indium, and selenium (CIS), a compound of copper, indium, gallium, and selenium (CIGS), or the like can be used.

An n-type semiconductor is preferably formed using a material with a wide band gap and a light-transmitting property with respect to visible light. For example, zinc oxide, gallium oxide, indium oxide, tin oxide, a mixed oxide thereof, or the like can be used. In addition, these materials have a function of a hole-injection blocking layer, so that a dark current can be decreased.

Figure 13D:
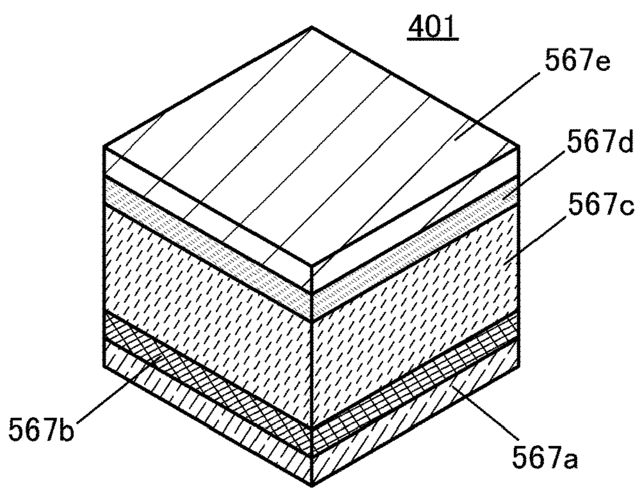

The photoelectric conversion device 401 included in the layer 561 may have a stacked-layer structure of a layer **567*a*, a layer 567*b*, a layer 567*c*, a layer 567*d*, and a layer 567*e* as illustrated in FIG. 13D. The photoelectric conversion device 401 illustrated in FIG. 13D is an example of an organic photoconductive film; the layer 567*a* is a lower electrode, the layer 567*e* is an upper electrode having a light-transmitting property, and the layer 567*b*, the layer 567*c*, and the layer 567*d*** correspond to a photoelectric conversion portion.

One of the layer **567*b* and the layer 567*d* of the photoelectric conversion portion can be a hole-transport layer, and the other can be an electron-transport layer. The other of the layer 567*b* and the layer 567*d* can be an electron-transport layer. The layer 567*c*** can be the photoelectric conversion layer.

For the hole-transport layer, molybdenum oxide or the like can be used, for example. In addition, for the electron-transport layer, for example, fullerene such as $C_{60}$ or $C_{70}$, a derivative thereof, or the like can be used.

As the photoelectric conversion layer, a mixed layer of an n-type organic semiconductor and a p-type organic semiconductor (bulk heterojunction structure) can be used.

The layer 563 illustrated in FIG. 13A includes a silicon substrate, for example. The silicon substrate can be provided with a Si transistor or the like. With the use of the Si transistor, the pixel 400 can be formed. In addition, the circuit 201 and the circuit 301 to the circuit 306 illustrated in FIG. 9 can be formed.

Next, a stacked structure of the imaging device is described with reference to cross-sectional views. Note that components such as insulating layers and conductive layers that are described below are examples, and the imaging device may further include another component. Alternatively, some of the components described below may be omitted. A stacked-layer structure described below can be formed by a bonding process, a polishing process, or the like as needed.

Figure 14:
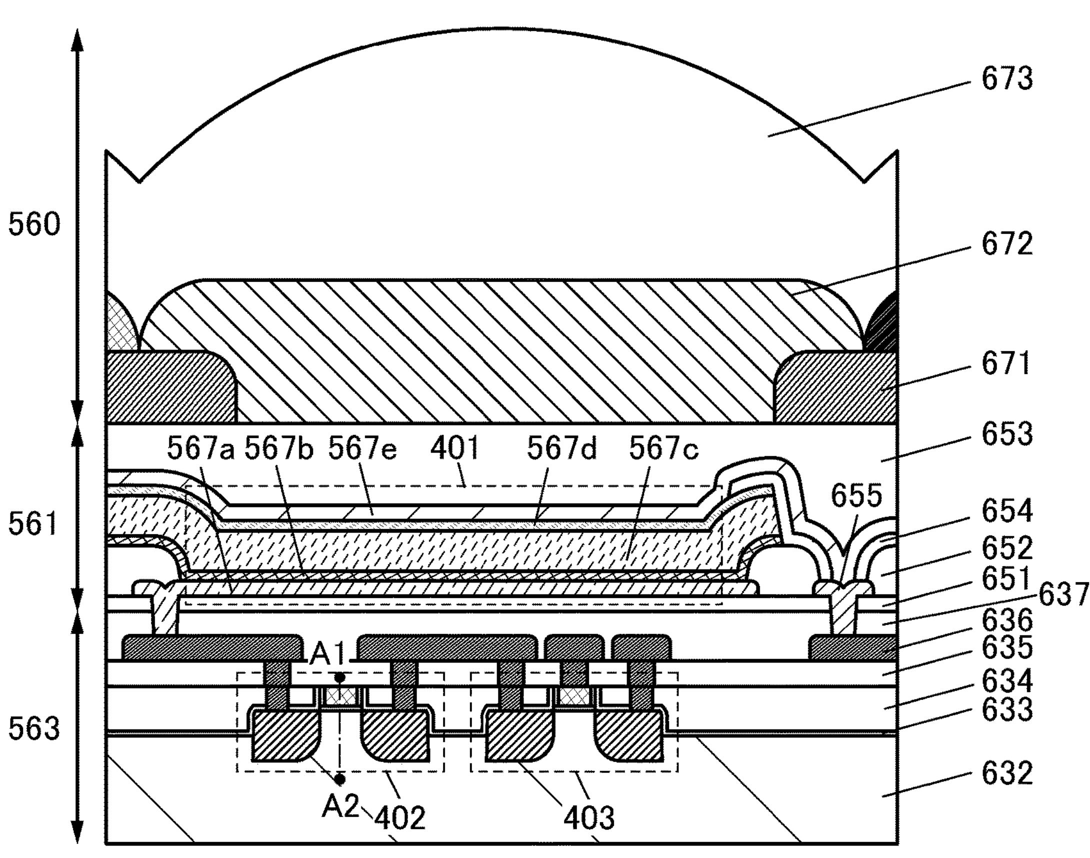
FIG. 14 is a cross-sectional view illustrating a structure example of an imaging device.

An imaging device with a structure illustrated in FIG. 14 includes a layer 560, the layer 561, and the layer 563. Although FIG. 14 shows the transistor 402 and the transistor 403 as components included in the layer 563, other components such as the transistor 404 to the transistor 406 can be provided in the layer 563.

A silicon substrate 632, an insulating layer 633, an insulating layer 634, an insulating layer 635, and an insulating layer 637 are provided in the layer 563. Moreover, a conductive layer 636 is provided.

The insulating layer 634, the insulating layer 635, and the insulating layer 637 function as interlayer insulating films and planarization films. The insulating layer 633 functions as a protective film. The conductive layer 636 is electrically connected to the wiring 414 in FIG. 11.

As the interlayer insulating film and the planarization film, for example, an inorganic insulating film such as a silicon oxide film or an organic insulating film of an acrylic resin, a polyimide resin, or the like can be used. As the protective film, for example, a silicon nitride film, a silicon oxide film, an aluminum oxide film, or the like can be used.

For a conductive layer, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing any of the above metal elements; an alloy containing a combination of the above metal elements; or the like. The conductor is not limited to a single layer, and may be a plurality of layers including different materials.

Figure 15A:
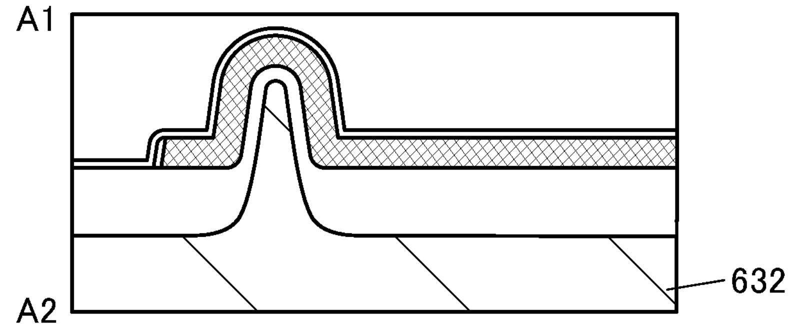
FIG. 15A to FIG. 15C are cross-sectional view each illustrating a structure example of a transistor.
Figure 15B:
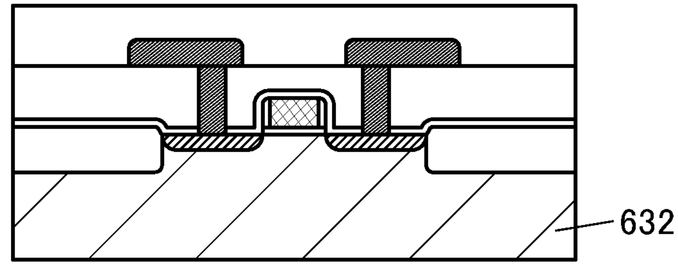

The Si transistor illustrated in FIG. 14 is a fin-type transistor including a channel formation region in the silicon substrate. FIG. 15A shows a cross section in the channel width direction (a cross section along A1-A2 in the layer 563 in FIG. 14). Note that the Si transistors may have a planar-type structure as illustrated in FIG. 15B.

Figure 15C:
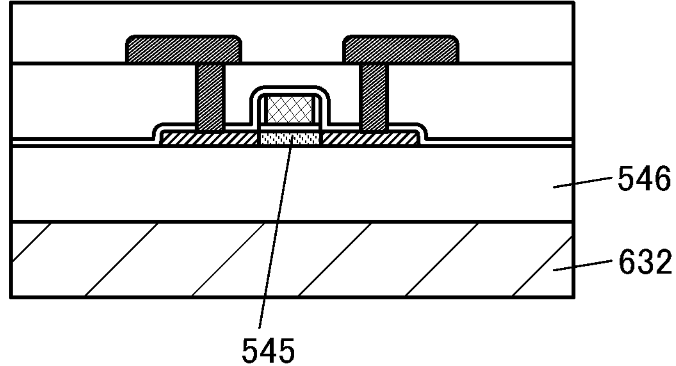

Alternatively, as illustrated in FIG. 15C, a transistor including a semiconductor layer 545 of a silicon thin film may be used. The semiconductor layer 545 can be single crystal silicon (SOI: Silicon on Insulator) formed on an insulating layer 546 on the silicon substrate 632, for example.

Furthermore, the photoelectric conversion device 401 is mainly provided in the layer 561. The photoelectric conversion device 401 can be formed over the layer 563. FIG. 14 shows a structure in which the photoelectric conversion device 401 uses the organic photoconductive film illustrated in FIG. 13D as the photoelectric conversion layer. Here, the layer 567*a* is a cathode and the layer 567*e* is an anode.

An insulating layer 651, an insulating layer 652, an insulating layer 653, an insulating layer 654 and a conductive layer 655 are provided in the layer 561.

The insulating layer 651, the insulating layer 653, and the insulating layer 654 function as interlayer insulating films and planarization films. The insulating layer 654 is provided to cover an end portion of the photoelectric conversion device 401, and has a function of preventing a short circuit between the layer 567*e* and the layer 567*a*. The insulating layer 652 functions as an element isolation layer. An organic insulating film or the like is preferably used as an element isolation layer.

The layer 567*a* corresponding to the cathode of the photoelectric conversion device 401 is electrically connected to one of the source and the drain of the transistor 402 included in the layer 563. The layer 567*e* corresponding to the anode of the photoelectric conversion device 401 is electrically connected to the conductive layer 636 included in the layer 563 through the conductive layer 655.

The layer 560 is formed over the layer 561. The layer 560 includes a light-blocking layer 671, an optical conversion layer 672, and a microlens array 673.

The light-blocking layer 671 can suppress entry of light into an adjacent pixel. As the light-blocking layer 671, a metal layer of aluminum, tungsten, or the like can be used. The metal layer and a dielectric film functioning as an anti-reflection film may be stacked.

A color filter can be used as the optical conversion layer 672. When colors of (red), G (green), B (blue), Y (yellow), C (cyan), M (magenta), and the like are assigned to the color filters of different pixels, a color image can be obtained. When a wavelength cut filter is used as the optical conversion layer 672, the imaging device can capture images in various wavelength regions.

For example, when an infrared filter that blocks light having a wavelength shorter than or equal to that of visible light is used as the optical conversion layer 672, an infrared imaging device can be obtained. When a filter that blocks light having a wavelength shorter than or equal to that of near infrared light is used as the optical conversion layer 672, a far-infrared imaging device can be obtained. When an ultraviolet filter that blocks light having a wavelength longer than or equal to that of visible light is used as the optical conversion layer 672, an ultraviolet imaging device can be obtained.

Furthermore, when a scintillator is used as the optical conversion layer 672, an imaging device that obtains an image visualizing the intensity of radiation, which is used for an X-ray imaging device or the like, can be obtained. Radiation such as X-rays passes through an object and enters the scintillator, and then is converted into light (fluorescence) such as visible light or ultraviolet light owing to a photoluminescence phenomenon. Then, the photoelectric conversion device 401 detects the light to obtain image data. Furthermore, the imaging device having this structure may be used in a radiation detector or the like.

The scintillator contains a substance that, when irradiated with radiation such as X-rays or gamma-rays, absorbs energy of the radiation to emit visible light or ultraviolet light. For example, resin or ceramics in which $Gd_2O_2S$:Tb, $Gd_2O_2S$:Pr, $Gd_2O_2S$:Eu, BaFCl:Eu, NaI, CsI, $CaF_2$, $BaF_2$, $CeF_3$, LiF, LiI, ZnO, or the like is dispersed can be used.

The microlens array 673 is provided over the optical conversion layer 672. Light passing through an individual lens of the microlens array 673 goes through the optical conversion layer 672 directly under the lens, and the photoelectric conversion device 401 is irradiated with the light. With the microlens array 673, collected light can be incident on the photoelectric conversion device 401; thus, photoelectric conversion can be efficiently performed. The microlens array 673 is preferably formed using a resin, glass, or the like having a high light transmitting property with respect to light with a wavelength subjected to imaging.

Figure 16:
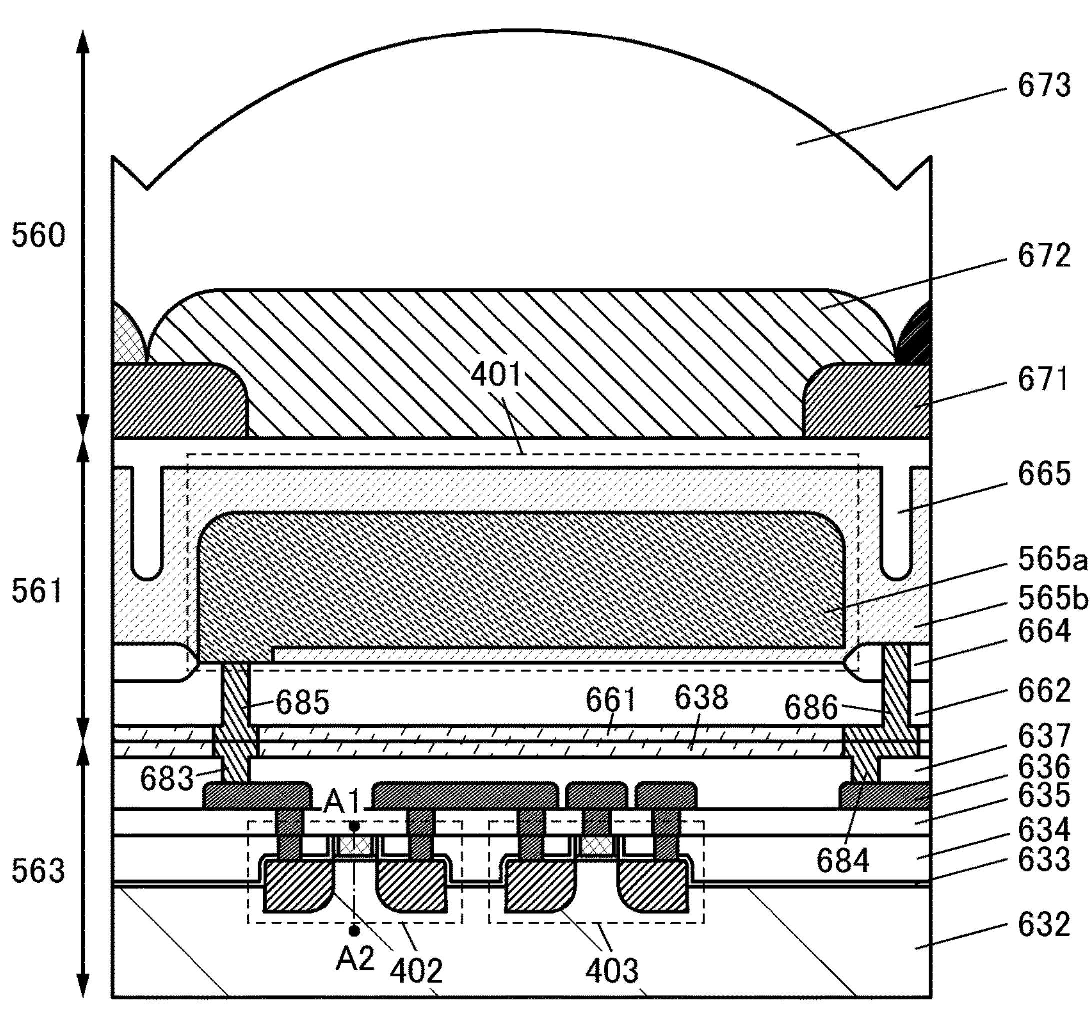
FIG. 16 is a cross-sectional view illustrating a structure example of an imaging device.

FIG. 16 illustrates a modification example of the stacked-layer structure illustrated in FIG. 14, in which the structure of the photoelectric conversion device 401 included in the layer 561 and part of the structure of the layer 563 are different. In the structure illustrated in FIG. 16, a bonding surface is provided between the layer 561 and the layer 563.

The layer 561 includes the photoelectric conversion device 401, an insulating layer 661, an insulating layer 662, an insulating layer 664, an insulating layer 665, a conductive layer 685, and a conductive layer 686.

The photoelectric conversion device 401 is a pn junction photodiode formed on a silicon substrate and includes the layer 565*b* corresponding to a p-type region and the layer 565*a* corresponding to an n-type region. The photoelectric conversion device 401 is a pinned photodiode, which can suppress a dark current and reduce noise with the thin p-type region (part of the layer 565*b*) provided on the surface side (current extraction side) of the layer 565*a*.

The insulating layer 661, the conductive layer 685, and the conductive layer 686 function as bonding layers. The insulating layer 662 functions as an interlayer insulating film and a planarization film. The insulating layer 664 functions as an element isolation layer. The insulating layer 665 has a function of suppressing carrier leakage.

The silicon substrate is provided with a groove that separates pixels, and the insulating layer 665 is provided on the top surface of the silicon substrate and in the groove. The insulating layer 665 can suppress leakage of carriers generated in the photoelectric conversion device 401 to an adjacent pixel. The insulating layer 665 also has a function of suppressing entry of stray light. Therefore, color mixture can be suppressed with the insulating layer 665. Note that an anti-reflection film may be provided between the top surface of the silicon substrate and the insulating layer 665.

The element isolation layer can be formed by a LOCOS (LOCal Oxidation of Silicon) method. Alternatively, an STI (Shallow Trench Isolation) method or the like may be used to form the element isolation layer. As the insulating layer 665, for example, an inorganic insulating film of silicon oxide, silicon nitride, or the like or an organic insulating film of polyimide, acrylic, or the like can be used. The insulating layer 665 may have a multilayer structure. Note that a structure without the element isolation layer may also be employed.

The layer 565*a* (corresponding to the n-type region and the cathode) of the photoelectric conversion device 401 is electrically connected to the conductive layer 685. The layer 565*b* (corresponding to the p-type region and the anode) is electrically connected to the conductive layer 686. The conductive layer 685 and the conductive layer 686 each include a region embedded in the insulating layer 661. Furthermore, the surfaces of the insulating layer 661, the conductive layer 685, and the conductive layer 686 are planarized to be level with each other.

In the layer 563, the insulating layer 638 is formed over the insulating layer 637. In addition, a conductive layer 683 electrically connected to one of the source and the drain of the transistor 402 and a conductive layer 684 electrically connected to the conductive layer 636 are formed.

The insulating layer 638, the conductive layer 683, and the conductive layer 684 function as bonding layers. The conductive layer 683 and the conductive layer 684 each include a region embedded in the insulating layer 638. Furthermore, the surfaces of the insulating layer 638, the conductive layer 683, and the conductive layer 684 are planarized to be level with each other.

The conductive layer 683 and the conductive layer 685 are preferably formed using a metal material containing the same metal element as a main component, and the conductive layer 684 and the conductive layer 686 are preferably formed using a metal material containing the same metal element as a main component. Furthermore, the main component in the insulating layer 638 is preferably the same as that in the insulating layer 661.

For the conductive layer 683 to the conductive layer 686, Cu, Al, Sn, Zn, W, Ag, Pt, or Au can be used, for example. In particular, Cu, Al, W, or Au is preferably used for easy bonding. In addition, for the insulating layer 638 and the insulating layer 661, silicon oxide, silicon oxynitride, silicon nitride oxide, silicon nitride, titanium nitride, or the like can be used.

That is, the same metal material described above is preferably used for the conductive layer 683 and the conductive layer 686. Furthermore, the same insulating material described above is preferably used for the insulating layer 638 and the insulating layer 661. With this structure, bonding can be performed at the boundary between the layer 563 and the layer 561.

Note that the conductive layer 683 to the conductive layer 686 may each have a multilayer structure of a plurality of layers; in that case, the outer layers (bonding surfaces) are formed of the same metal material. The insulating layer 638 and the insulating layer 661 may each have a multilayer structure of a plurality of layers; in that case, the outer layers (bonding surfaces) are formed of the same insulating material.

By the bonding, the conductive layer 683 and the conductive layer 685 can be electrically connected to each other, and the conductive layer 684 and the conductive layer 686 can be electrically connected to each other. Moreover, the connection between the insulating layer 661 and the insulating layer 638 with mechanical strength can be obtained.

For bonding metal layers to each other, a surface activated bonding method in which an oxide film, a layer adsorbing impurities, and the like on the surface are removed by sputtering processing or the like and the cleaned and activated surfaces are brought into contact to be bonded to each other can be used. Alternatively, a diffusion bonding method in which surfaces are bonded to each other by using temperature and pressure together, or the like can be used. Both methods cause bonding at an atomic level, and therefore not only electrically but also mechanically excellent bonding can be obtained.

Furthermore, for bonding insulating layers to each other, a hydrophilic bonding method or the like can be used; in the method, after high planarity is obtained by polishing or the like, surfaces of the insulating layers subject to hydrophilic treatment with oxygen plasma or the like are arranged in contact with and bonded to each other temporarily, and then dehydrated by heat treatment to perform final bonding. The hydrophilic bonding method also causes bonding at an atomic level; thus, mechanically excellent bonding can be obtained.

When the layer 563 and the layer 561 are bonded to each other, the insulating layers and the metal layers coexist on their bonding surfaces; therefore, the surface activated bonding method and the hydrophilic bonding method are performed in combination, for example.

For example, the following method can be used: the surfaces are made clean after polishing, the surfaces of the metal layers are subject to antioxidant treatment and hydrophilicity treatment, and then bonding is performed. Furthermore, hydrophilic treatment may be performed on the surfaces of the metal layers being hardly oxidizable metal such as Au. Note that a bonding method other than the above-mentioned methods may be used.

The above bonding allows the components included in the layer 563 to be electrically connected to the components included in the layer 561.

Figure 17:
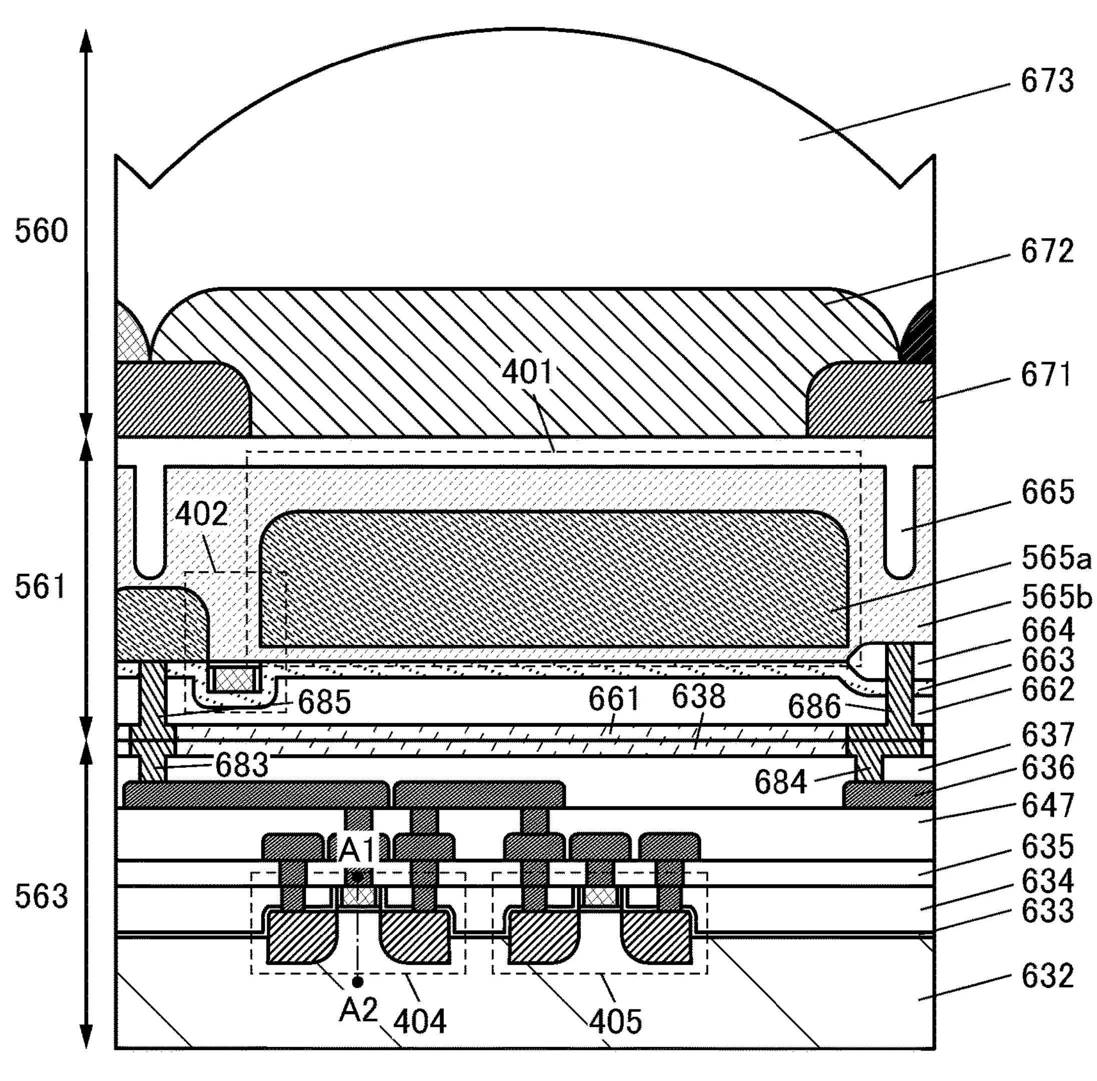
FIG. 17 is a cross-sectional view illustrating a structure example of an imaging device.

FIG. 17 illustrates a modification example of the stacked-layer structure illustrated in FIG. 16, in which the structures of the layer 561 and the layer 563 are partly different.

This modification example has a structure in which the transistor 402 included in the pixel 400 is provided in the layer 561. The transistor 402 is formed of a Si transistor in the layer 561. One of the source and the drain of the transistor 402 is directly connected ton one electrode of the photoelectric conversion device 401. The other of the source and the drain of the transistor 402 is electrically connected to the node FD.

In the imaging device illustrated in FIG. 17, the layer 563 includes transistors other than at least the transistor 402 in the transistors included in the imaging device. Although FIG. 17 shows the transistor 404 and the transistor 405 as components included in the layer 563, other components such as the transistor 403 and the transistor 406 can be provided in the layer 563. Furthermore, the layer 563 in the imaging device illustrated in FIG. 17 includes an insulating layer 647 between the insulating layer 635 and the insulating layer 637. The insulating layer 647 functions as an interlayer insulating film and a planarization film.

REFERENCE NUMERALS

10: neural network model, 10*a*: neural network model, 21: data, 22: data, 23: data, 24: data, 25: data set, 26: data, 27: data set, 28: data, 29: data set, 34: feature map, 35: feature map set, 36: feature map, 37: feature map set, 41: data, 42: data set, 43: output data, 44: data set, 45: data, 46: data, 100: arithmetic processing system, 110: data processing device, 111: imaging portion, 112: output portion, 113: arithmetic portion, 114: main storage portion, 115: auxiliary storage portion, 116: communication portion, 117: transmission path, 120: data processing device, 121: imaging portion, 122: output portion, 123: arithmetic portion, 124: main storage portion, 125: auxiliary storage portion, 126: communication portion, 127: transmission path, 200: pixel block, 201: circuit, 202: capacitor, 203: transistor, 204: transistor, 205: transistor, 206: transistor, 207: resistor, 211: wiring, 212: wiring, 213: wiring, 215: wiring, 216: wiring, 217: wiring, 218: wiring, 219: wiring, 300: pixel array, 301: circuit, 302: circuit, 303: circuit, 304: circuit, 305: circuit, 306: circuit, 311: wiring, 400: pixel, 401: photoelectric conversion device, 402: transistor, 403: transistor, 404: transistor, 405: transistor, 406: transistor, 407: capacitor, 411: wiring, 412: wiring, 413: wiring, 414: wiring, 415: wiring, 417: wiring, 421: wiring, 422: wiring, 423: wiring, 424: wiring, 450: transistor, 545: semiconductor layer, 546: insulating layer, 560: layer, 561: layer, 563: layer, 565*a*: layer, 565*b*: layer, 566*a*: layer, 566*b*: layer, 566*c*: layer, 566*d*: layer, 567*a*: layer, 567*b*: layer, 567*c*: layer, 567*d*: layer, 567*e*: layer, 632: silicon substrate, 633: insulating layer, 634: insulating layer, 635: insulating layer, 636: conductive layer, 637: insulating layer, 638: insulating layer, 647: insulating layer, 651: insulating layer, 652: insulating layer, 653: insulating layer, 654: insulating layer, 655: conductive layer, 661: insulating layer, 662: insulating layer, 664: insulating layer, 665: insulating layer, 671: light-blocking layer, 672: photoelectric conversion layer, 673: microlens array, 683: conductive layer, 684: conductive layer, 685: conductive layer, 686: conductive layer

The invention claimed is:

1. A neural network model comprising:

a first neural network; and a second neural network, wherein the first neural network comprises a first layer, a second layer, and a third layer, wherein the neural network model is configured to make a data processing device output noise-removed image data from input image data while performing segmentation or depth estimation on the image data or while producing color image data from the image data in case of the image data being grayscale data, wherein a feature map output from the first layer is input to the second layer and the second neural network, wherein a feature map output from the second neural network is input to the third layer, wherein when first data is input to the first neural network, in the second neural network, the feature map output from the first layer is a correct feature map, wherein when second data obtained by adding noise to the first data is input to the first neural network, in the second neural network, the feature map output from the first layer is a learning feature map, and wherein the second neural network is learned with first learning so that the feature map output from the second neural network matches the correct feature map when the learning feature map is input to the second neural network.

2. The neural network model according to claim 1, wherein a weight coefficient of the second neural network is acquired with the first learning after data for acquiring an initial value is input to the first neural network to acquire an initial value of a weight coefficient of the first neural network.

3. The neural network model according to claim 2, wherein a weight coefficient of the first neural network is acquired with second learning performed by inputting the second data to the first neural network after acquiring the weight coefficient of the second neural network.

4. The neural network model according to claim 1, wherein the first neural network comprises a fourth layer, a fifth layer, and a sixth layer, wherein a feature map output from the fourth layer is input to the fifth layer and the sixth layer skip-connected to the fourth layer, wherein the fourth layer is closer to an output layer of the first neural network than the first layer is, and wherein the third layer is closer to the output layer of the first neural network than the sixth layer is.

5. A neural network model comprising:

a first neural network; and a second neural network, wherein the first neural network comprises a first layer, a second layer, a third layer, and a fourth layer, wherein the neural network model is configured to make a data processing device output noise-removed image data from input image data while performing segmentation or depth estimation on the image data or while producing color image data from the image data in case of the image data being grayscale data, wherein the fourth layer, the third layer, the second layer, and the first layer in this order are close to an output layer of the first neural network, wherein a feature map output from the first layer is input to the second layer and the second neural network, wherein a feature map output from the third layer and a feature map output from the second neural network are input to the fourth layer, wherein when first data is input to the first neural network, in the second neural network, the feature map output from the first layer is a correct feature map, wherein when second data obtained by adding noise to the first data is input to the first neural network, in the second neural network, the feature map output from the first layer is a learning feature map, and wherein the second neural network is learned with first learning so that the feature map output from the second neural network matches the correct feature map when the learning feature map is input to the second neural network.

6. The neural network model according to claim 5, wherein a weight coefficient of the second neural network is acquired with the first learning after data for acquiring an initial value is input to the first neural network to acquire an initial value of a weight coefficient of the first neural network.

7. The neural network model according to claim 6, wherein a weight coefficient of the first neural network is acquired with second learning performed by inputting the second data to the first neural network after acquiring the weight coefficient of the second neural network.

8. The neural network model according to claim 5, wherein the first neural network comprises a fifth layer, a sixth layer, and a seventh layer, wherein a feature map output from the fifth layer is input to the sixth layer and the seventh layer skip-connected to the fifth layer, wherein the fifth layer is closer to an output layer of the first neural network than the first layer is, and wherein the fourth layer is closer to the output layer of the first neural network than the seventh layer is.

9. A learning method of a neural network model, the neural network model comprising a first neural network and a second neural network, wherein the first neural network comprises a first layer, a second layer, and a third layer, wherein the neural network model is configured to make a data processing device output noise-removed image data from input image data while performing segmentation or depth estimation on the image data or while producing color image data from the image data in case of the image data being grayscale data, wherein a feature map output from the first layer is input to the second layer and the second neural network, wherein a feature map output from the second neural network is input to the third layer, the learning method comprises:

a first step of acquiring an initial value of a weight coefficient of the first neural network by inputting data for acquiring an initial value to the first neural network;

a second step of acquiring a weight coefficient of the second neural network by performing first learning under a condition that the feature map output from the first layer when first data is input to the first neural network is a correct feature map and the feature map output from the first layer when second data obtained by adding noise to the first data is input to the first neural network is a learning feature map, so that the feature map output from the second neural network matches the correct feature map when the learning feature map is input to the second neural network;

a third step of performing second learning by inputting the second data to the first neural network, thereby acquiring a weight coefficient of the first neural network; and a fourth step of inputting test data to the first neural network, thereby evaluating interference accuracy of the neural network model on the basis of output data output from the first neural network, wherein the second to the fourth steps are repeated until the interference accuracy comes to have a predetermined value or a value higher than the predetermined value.

10. The learning method of a neural network model according to claim 9, wherein the first neural network comprises a fourth layer, a fifth layer, and a sixth layer, wherein a feature map output from the fourth layer is input to the fifth layer and the sixth layer skip-connected to the fourth layer, wherein the fourth layer is closer to the output layer of the first neural network than the first layer is, and wherein the third layer is closer to the output layer of the first neural network than the sixth layer is.

11. The neural network model according to claim 1, wherein a first intermediate layer of the first neural network closest to an input layer of the first neural network is skip-connected to a second intermediate layer of the first neural network closest to an output layer of the first neural network via the second neural network.

12. The neural network model according to claim 1, wherein the first neural network comprises a plurality of skip-connected intermediate layer pairs.

13. The neural network model according to claim 1, wherein a first intermediate layer of the first neural network closest to an input layer of the first neural network is skip-connected to a second intermediate layer of the first neural network via the second neural network, wherein the second intermediate layer is connected to a third intermediate layer of the first neural network closest to an output layer of the first neural network, and wherein a fourth intermediate layer of the first neural network is skip-connected to a fifth intermediate layer of the first neural network without passing through the second neural network.

14. The neural network model according to claim 1, wherein a first intermediate layer of the first neural network closest to an input layer of the first neural network is skip-connected to a second intermediate layer of the first neural network via the second neural network, wherein the second intermediate layer is connected to a third intermediate layer of the first neural network closest to an output layer of the first neural network, wherein a fourth intermediate layer of the first neural network is connected to the first intermediate layer, wherein the fourth intermediate layer is connected to a fifth intermediate layer of the first neural network, wherein the fifth intermediate layer is skip-connected to a sixth intermediate layer of the first neural network, wherein the sixth intermediate layer is connected to a seventh intermediate layer of the first neural network, and wherein the seventh intermediate layer is connected to the second intermediate layer.

* * * * *